(12) United States Patent
Sugiura et al.

(10) Patent No.: US 12,081,661 B2
(45) Date of Patent: Sep. 3, 2024

(54) VALUABLES MANAGEMENT SYSTEM

(71) Applicant: SYSNA, Inc., Aichi (JP)

(72) Inventors: Shinichi Sugiura, Nagoya (JP);
Nobuyuki Nakahara, Tokyo (JP);
Mika Asano, Nagoya (JP)

(73) Assignee: SYSNA, Inc., Aichi (JP)

( * ) Notice: Subject to any disclaimer, the term of this patent is extended or adjusted under 35 U.S.C. 154(b) by 704 days.

(21) Appl. No.: 17/254,844

(22) PCT Filed: May 28, 2020

(86) PCT No.: PCT/JP2020/021107
§ 371 (c)(1),
(2) Date: Dec. 21, 2020

(87) PCT Pub. No.: WO2021/010030
PCT Pub. Date: Jan. 21, 2021

(65) Prior Publication Data
US 2021/0288791 A1      Sep. 16, 2021

(30) Foreign Application Priority Data

Jul. 12, 2019   (JP) .................................. 2019-130138

(51) Int. Cl.
*H04L 29/06*        (2006.01)
*G06F 21/64*        (2013.01)
(Continued)

(52) U.S. Cl.
CPC .............. *H04L 9/088* (2013.01); *G06F 21/64* (2013.01); *H04L 9/3236* (2013.01)

(58) Field of Classification Search
CPC ....... H04L 9/088; H04L 9/3236; H04L 63/12; H04L 2209/56; H04L 9/0894;
(Continued)

(56) References Cited

U.S. PATENT DOCUMENTS

| 6,321,213 | B1 | 11/2001 | Ito et al. |
| 11,265,146 | B2 * | 3/2022 | Han ........................ G06F 21/64 |

(Continued)

FOREIGN PATENT DOCUMENTS

| JP | H11250164 A | 9/1999 |
| JP | 2000113083 A | 4/2000 |

(Continued)

OTHER PUBLICATIONS

Tian Haibo et al.; "AFCoin: A Framework for Digital Fiat Currency of Central Banks Based on Account Model", Advances in Databases and Information Systems; [Lecture Notes in Computer Science; Lect. Notes Computer]; Feb. 21, 2019; pp. 70-85; Springer International Publishing, Cham.

(Continued)

*Primary Examiner* — Taghi T Arani
*Assistant Examiner* — Lin Chang
(74) *Attorney, Agent, or Firm* — Studebaker & Brackett PC

(57) ABSTRACT

In a blockchain, contents of a transaction are basically made public, and a malicious person can find system vulnerability of the blockchain. The person is likely to exploit the vulnerability and cause leak of cryptocurrency to an unintended third party through unauthorized access or the like. Thus, it cannot be said that sufficient security measures are taken. In the present invention, a colony server stores partial data containing data of a predetermined size from a beginning of valuables data received from a terminal, and a center server stores body data containing data of the predetermined size +1 and thereafter. Thus, the valuables data is managed in a divided manner. Also, even if the body data is leaked from the colony server through unauthorized access or the like, the body data is merely part of the valuables data, and has no value on its own. Thus, the present invention provides (Continued)

a system and the like for achieving robust security against unauthorized access.

20 Claims, 22 Drawing Sheets

(51) Int. Cl.
*H04L 9/08* (2006.01)
*H04L 9/32* (2006.01)

(58) Field of Classification Search
CPC ..... H04L 9/3239; H04L 9/50; H04L 2209/34; G06F 21/64; G06F 21/6245; G06F 16/27; G06F 16/23; G06F 21/602; G06Q 40/04
See application file for complete search history.

(56) References Cited

U.S. PATENT DOCUMENTS

| | | | |
|---|---|---|---|
| 2003/0233279 A1 | 12/2003 | Shinzaki | |
| 2004/0105549 A1* | 6/2004 | Suzuki | H04L 9/0891 380/278 |
| 2007/0219917 A1 | 9/2007 | Liu et al. | |
| 2012/0173883 A1* | 7/2012 | Orsini | G06F 21/602 713/189 |
| 2014/0122454 A1* | 5/2014 | Brylyn | G06F 8/53 707/705 |
| 2019/0132131 A1* | 5/2019 | Clements | H04L 9/3239 |
| 2019/0303621 A1* | 10/2019 | Baset | G06Q 20/223 |
| 2019/0311148 A1* | 10/2019 | Andrade | H04L 63/0861 |
| 2019/0342084 A1* | 11/2019 | Mehedy | H04L 9/0643 |
| 2020/0142884 A1* | 5/2020 | Thapar | G06Q 10/1053 |
| 2020/0394220 A1* | 12/2020 | Novotny | G06F 16/9024 |
| 2020/0412549 A1* | 12/2020 | Endo | H04L 9/0643 |
| 2021/0011882 A1* | 1/2021 | Zhao | G06F 16/152 |
| 2021/0200810 A1* | 7/2021 | Nakashima | G06Q 50/26 |

FOREIGN PATENT DOCUMENTS

| | | | |
|---|---|---|---|
| JP | 2007531127 A | | 11/2007 |
| JP | 6517027 | * | 8/2016 |
| JP | 2019106639 A | | 6/2019 |
| JP | 6683332 B1 | | 4/2020 |
| WO | 2002050789 A1 | | 6/2002 |

OTHER PUBLICATIONS

Dai Mingjun et al.; "A Low Storage Room Requirement Framework for Distributed Ledger in Blockchain", IEEE Access; vol. 6; May 14, 2018; pp. 22970-22975.
The extended European search report issued by the European Patent Office on Mar. 4, 2022, which corresponds to European Patent Application No. 20823712.3-1218 and is related to U.S. Appl. No. 17/254,844.
International Search Report issued in PCT/JP2020/021107; mailed Aug. 25, 2020.
International Preliminary Report on Patentability and Written Opinion issued in PCT/JP2020/021107; issued Jan. 18, 2022.
Office Action issued in JP 2019-153552; mailed by the Japanese Patent Office on Sep. 17, 2019.
Written Opinion issued in PCT/JP2020/021107; mailed Aug. 25, 2020.

* cited by examiner

FIG.9
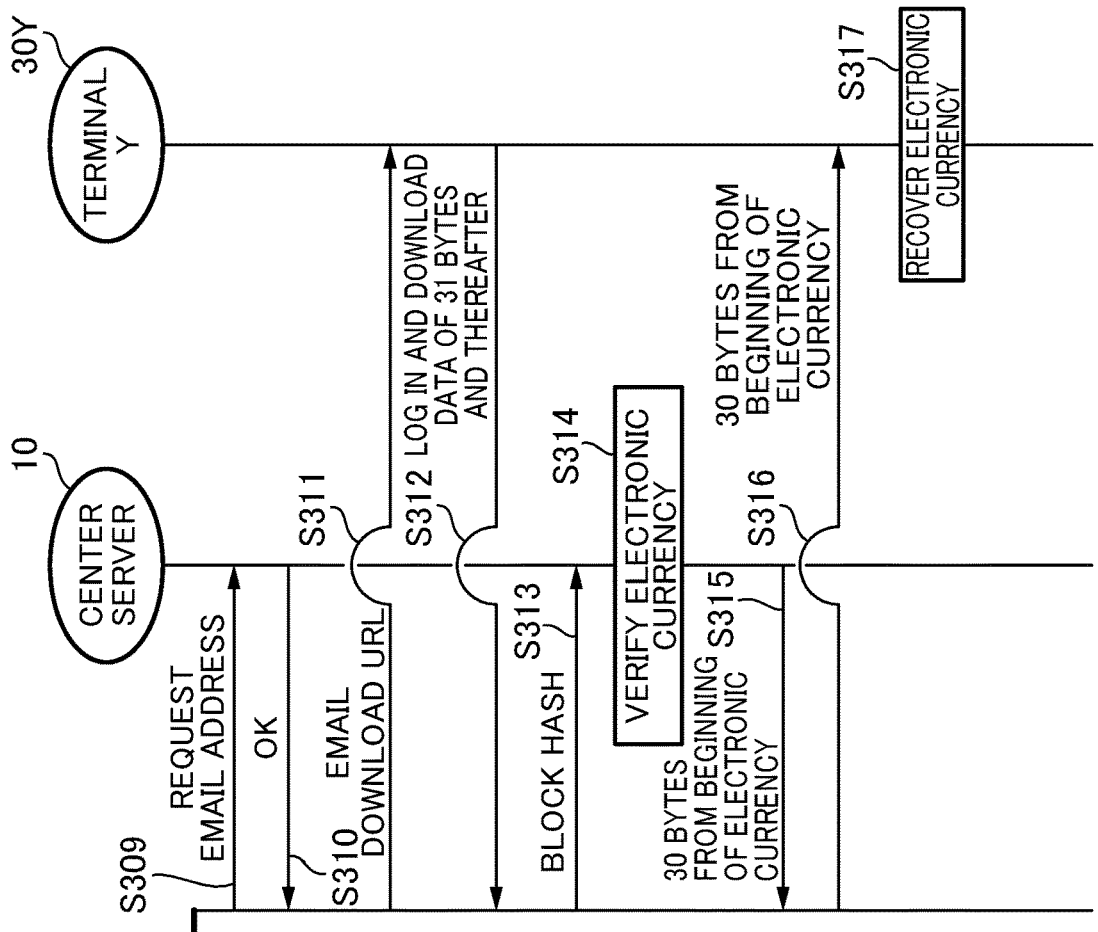
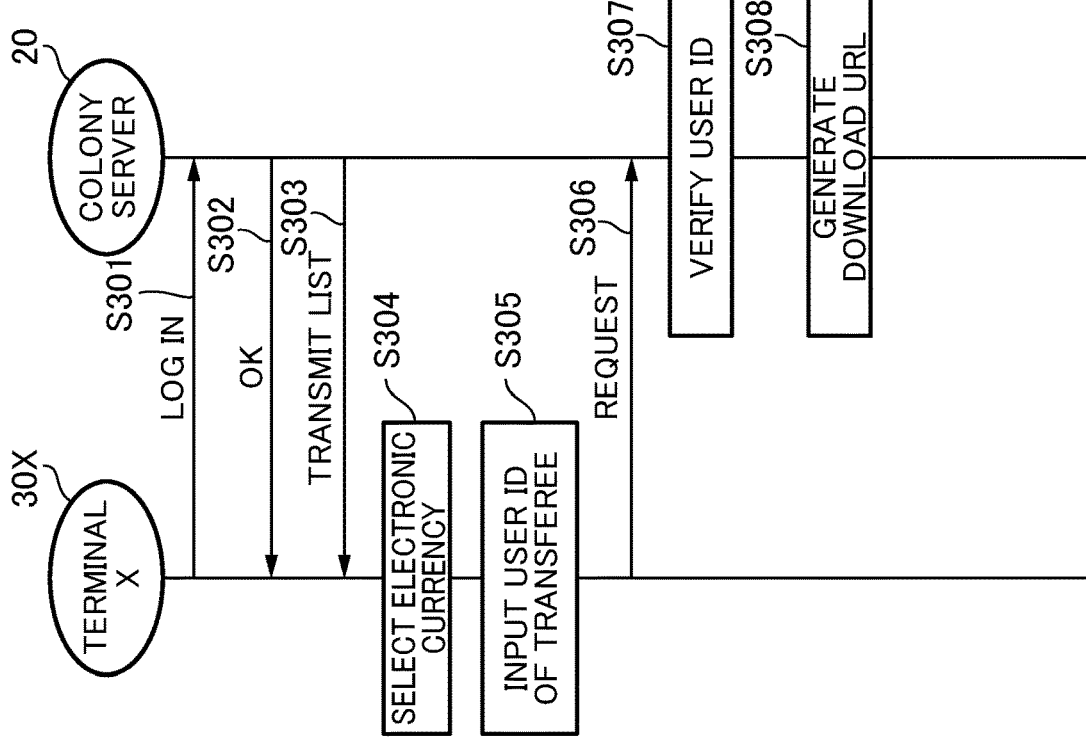

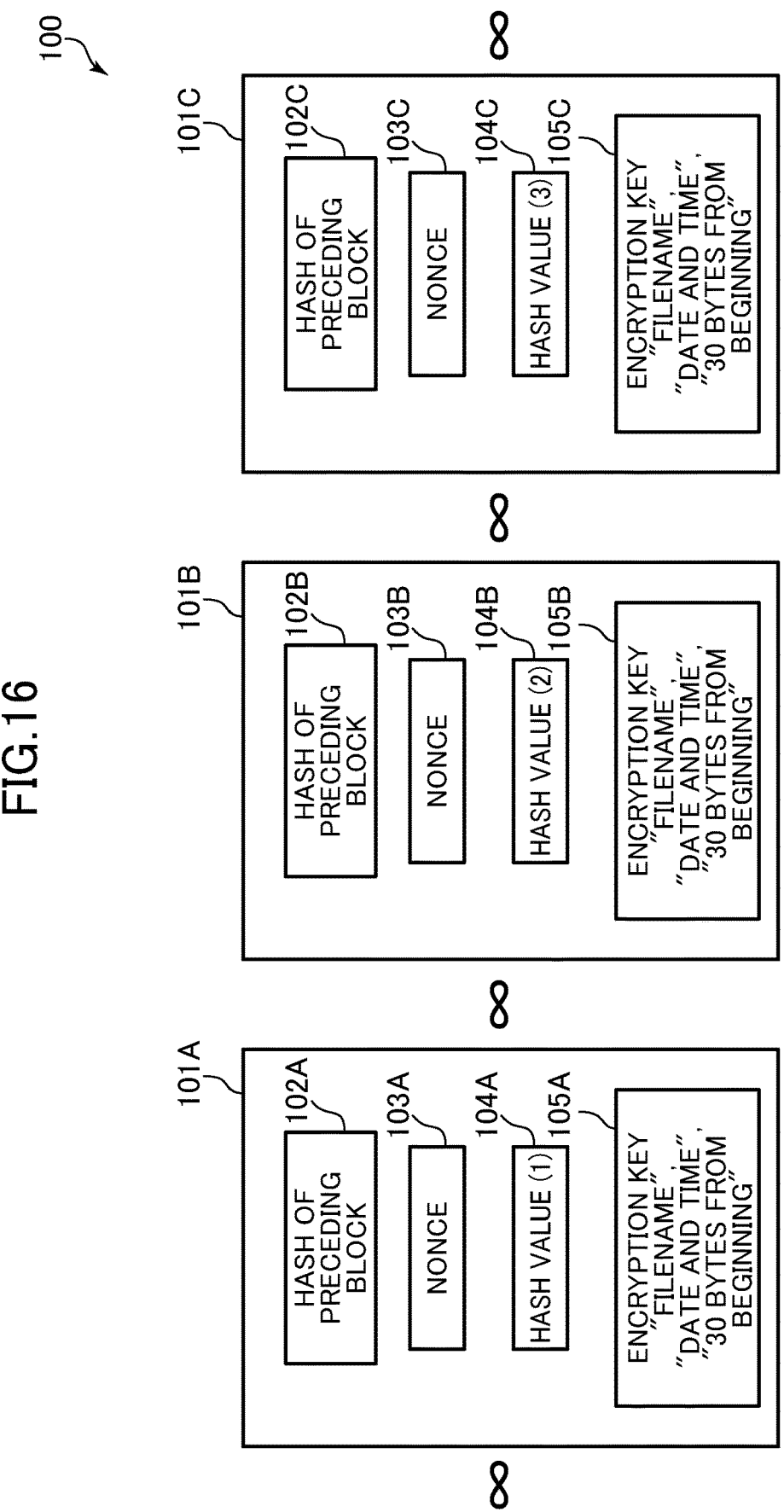

FIG.17A

CENTER SERVER (DATA INDEPENDENT OF DATA RELATED TO BLOCKCHAIN)

| COLONY SERVER ID | USER ID | VALID FLAG (TRUE/FALSE) |
|---|---|---|
| AAAAAAAAAAAA | XXXXXXXXXXXXXXXX | TRUE |
| BBBBBBBBBBBB | YYYYYYYYYYYYYYYY | TRUE |
| CCCCCCCCCCCC | ZZZZZZZZZZZZZZZZ | FALSE |

FIG.17B

| USER ID | EMAIL ADDRESS | VALID FLAG (TRUE/FALSE) |
|---|---|---|
| XXXXXXXXXXXXXXXX | xxx@abc.co.jp | TRUE |
| YYYYYYYYYYYYYY | yyy@abc.net | TRUE |
| ZZZZZZZZZZZZZZ | zzz@ccc.ac.jp | FALSE |

FIG.18

COLONY SERVER

| USER ID | OWNED BLOCK HASH (64 BYTES) | TRANSACTION DATE AND TIME (YYYY/MM/DD HH:MM:SS) | VALID FLAG (TRUE/FALSE) |
|---|---|---|---|
| xxxxxxxxxxxxxxxx | HASH VALUE(1) | 20190511001125 | TRUE |
| yyyyyyyyyyyyyyyy | HASH VALUE(2) | 20190406002255 | TRUE |
| zzzzzzzzzzzzzzzz | HASH VALUE(3) | 20180115051645 | FALSE |

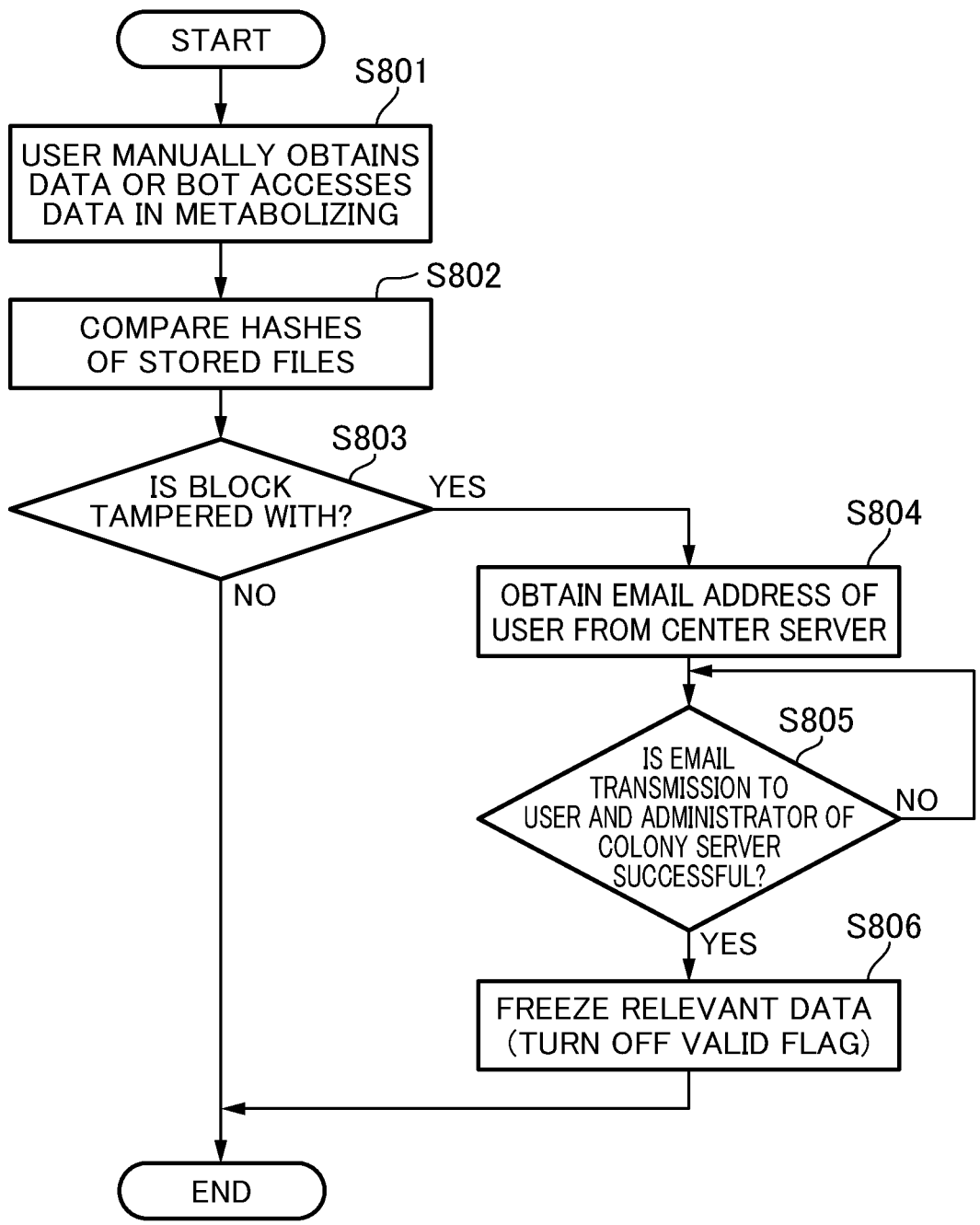

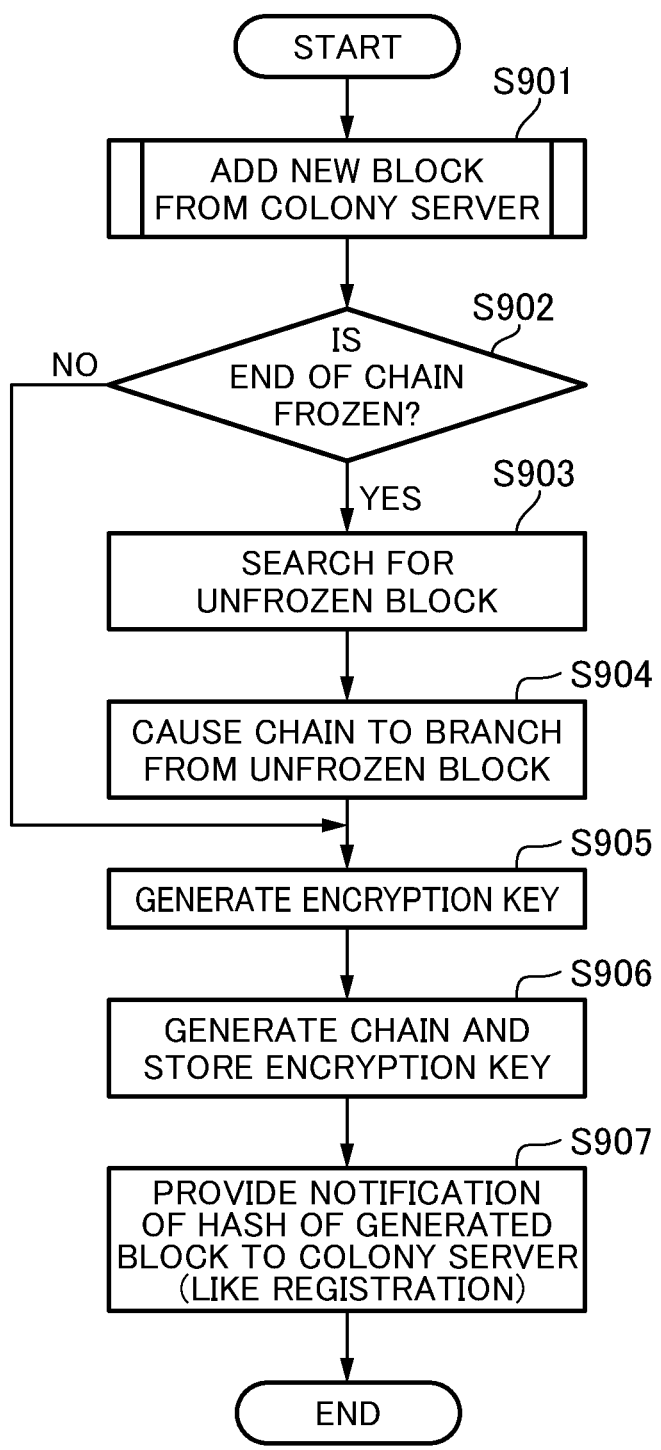

VALUABLES MANAGEMENT SYSTEM

TECHNICAL FIELD

The present invention relates to a system, a method, a device, and a program for safely storing valuables data such as cryptocurrency, virtual currency, electronic currency, or valuable securities through a network such as the Internet in a plurality of servers forming a cloud, and allowing an information processing terminal used by a user to obtain the valuables data as appropriate in response to a request from the terminal.

Specifically, the present invention relates to a technology such that a server (hereinafter referred to as "colony server") connected to a user's information processing terminal such as a smartphone or a computer through a network such as the Internet divides valuables data uploaded from the user's information processing terminal into partial data containing data of a predetermined size from a beginning and body data containing subsequent data, and transmits the partial data to a server (hereinafter referred to as "center server") connected through a closed network to the colony server, the center server encrypts the received partial data and stores the partial data as one block of a blockchain, updates a hash value of the partial data at predetermined intervals, and updates a hash value of the body data to the same value as that of the partial data, thereby achieving high security and allowing safe circulation of valuables data.

BACKGROUND ART

Conventionally, transactions of financial instruments or the like have been conducted through reliable centralized institutions such as financial institutions or governments, but, in recent years, a distributed ledger technology using a blockchain on peer-to-peer (P2P) between users has been available in place of direct transactions.

The distributed ledger technology allows transactions between parties to a distributed ledger system to be settled by consensus building or approval by (any or particular) parties rather than centralized institutions. The distributed ledger technology can also substantially preclude tampering by combining a plurality of transactions as blocks, recording the blocks like beads in a distributed ledger called a blockchain, and performing hash calculation of the continuous blocks. Further, the distributed ledger technology allows transactions to be checked by all parties by the same ledger data being shared by all the parties.

From the above features, the distributed ledger technology such as a blockchain has been considered to be applied in a variety of fields including financial sectors and Internet of Things (IoT) as a reliable system for managing and sharing data or for conducting and managing a transaction under a contract. As one application, a transaction of cryptocurrency such as Bitcoin has implemented the distributed ledger technology such as a blockchain. Cryptocurrency is also referred to as virtual currency.

In electronic commerce in which a user uses an information processing terminal such as a smartphone to buy and sell cryptocurrency (such as virtual currency, various financial instruments) on-line through a network, transaction records can be recorded on a blockchain. For example, Japanese Patent Laid-Open No. 2019-106639 (Patent Literature 1) discloses an electronic commerce device and the like that allows the electronic commerce as described above to be conducted on a blockchain. On the blockchain, absconding of contents or the like can be prevented due to difficulty in tampering of transaction records or the like even without trust between parties or trust in a third party.

CITATION LIST

Patent Literature

Patent Literature 1: Japanese Patent Laid-Open No. 2019-106639

SUMMARY OF INVENTION

Technical Problem

As described above, the electronic commerce of cryptocurrency can be achieved using a blockchain, however, in the blockchain, fairness of a transaction is guaranteed by nodes constituting the blockchain, and contents of the transaction are basically made public. Thus, a malicious person can search for system vulnerability of the blockchain. If finding vulnerability, the person is likely to exploit the vulnerability and cause leak of cryptocurrency to an unintended third party through unauthorized access or the like. Thus, it cannot be said that sufficient security measures for the blockchain are taken.

Also, guaranteeing fairness of a transaction recorded on a blockchain requires verifying, using a computer, that each of a plurality of blocks in the blockchain is a correct record. For example, a Proof of Work (POW) system used by Bitcoin requires an enormous amount of calculation using a computer to change a value called nonce in a brute-force manner to calculate a hash value (for example, a hash value beginning from a certain number of consecutive zeros) that satisfies a predetermined condition in order to add a new block to the blockchain, and the calculation consumes a large amount of power.

To solve these problems, the present invention provides a valuables management system including at least a terminal, a colony server, and a center server to safely store valuables data such as cryptocurrency or valuable securities on a cloud and distribute the valuables data on-line to users as appropriate. In the valuables management system according to the present invention, the colony server stores partial data containing data of a predetermined size from a beginning of valuables data received from the terminal, and the center server stores body data containing data of the predetermined size +1 and thereafter. Thus, the valuables data is managed in a divided manner into the partial data and the body data. Also, even if the body data is leaked from the colony server through unauthorized access or the like, the body data is merely part of the valuables data, and has no value on its own. As such, the present invention provides a valuables management system, method, device, and program (hereinafter also simply referred to as "valuables system and the like") that achieve robust security against substantial damage even if the body data is unauthorizedly leaked from the colony server.

Also, in the present invention, the center server encrypts the received partial data and stores the partial data as one block of a blockchain, updates a hash value of the partial data at predetermined intervals, and updates a hash value of the body data in the colony server to the same value as that of the partial data. Then, even if the body data is leaked from the colony server through unauthorized access or the like, and an attempt is made to identify an encryption key containing the partial data paired with the body data, the hash value of the encryption key is updated at predetermined intervals, and thus an encryption key containing a hash value matching the hash value contained in the unauthorizedly leaked body data no longer exists. Thus, the present invention provides a valuables management system and the like that precludes recovery of the valuables data from the unauthorizedly leaked body data.

Further, in the present invention, the center server can store only the partial data as part of the valuables data rather than the entire valuables data in the blockchain, and thus can manage the blockchain within a relatively small storage area. The present invention provides a valuables management system and the like that can simplify or omit calculation for guaranteeing fairness of the blockchain by the center server being operated in reliable institutions such as governments or banks.

Solution to Problem

As an embodiment of a valuables management system according to the present invention, the valuables management system includes at least: a terminal; a colony server connected through a first network to the terminal; and a center server connected through a second network to the colony server, the terminal transmits a transaction request related to valuables to the colony server, the colony server includes a division transmission unit configured to divide valuables data obtained or generated in response to the transaction request related to the valuables into partial data containing data of a predetermined size from a beginning, and body data containing data of the predetermined size +1 and thereafter, and transmit the partial data to the center server, and a body data management unit configured to receive a block hash value from the center server, and store the block hash value associated with the body data as a hash value of the body data, the center server includes a partial data management unit configured to encrypt the partial data, generate a block that stores the encrypted partial data as an encryption key, and add the block to the blockchain, and a hash notification unit configured to update a block hash value of the block at predetermined intervals and transmit the updated block hash value to the colony server, and the body data management unit updates the hash value of the body data to a block hash value transmitted from the hash notification unit at the predetermined intervals.

As a preferred embodiment of the valuables management system according to the present invention, a block in the blockchain includes a flag that indicates valid when a new block can be connected to the block, and indicates invalid when a new block cannot be connected to the block, and the partial data management unit determines whether or not a flag of a destination block indicates valid when a new block is connected, generates a new block when the flag indicates valid, stores, in the new block, at least the encryption key, a block hash of the destination block, and a block hash of the new block, invalidates the flag of the destination block when the new block is connected to the destination block, and further stores, in the new block, a flag that indicates valid as an initial value.

As a preferred embodiment of the valuables management system according to the present invention, the partial data management unit encrypts the partial data together with at least one of a filename and a transaction date and time of the valuables data, and the encryption key contains the partial data and at least one of the filename and the transaction date and time.

As a preferred embodiment of the valuables management system according to the present invention, the transaction request related to the valuables contains valuables data corresponding to the valuables uploaded from the terminal.

As a preferred embodiment of the valuables management system according to the present invention, the transaction request related to the valuables is a request to cause the colony server to generate valuables data corresponding to the valuables.

As a preferred embodiment of the valuables management system according to the present invention, the predetermined size is 30 bytes or less from the beginning of the valuables data.

As a preferred embodiment of the valuables management system according to the present invention, the predetermined interval is 24 hours or shorter.

As a preferred embodiment of the valuables management system according to the present invention, the first network is the Internet and the second network is a closed network.

As a preferred embodiment of the valuables management system according to the present invention, the valuables management system further includes a monitor bot configured to monitor tampering of the blockchain, and when finding tampering of one block in the blockchain, the monitor bot invalidates the one block and subsequent blocks.

As a preferred embodiment of the valuables management system according to the present invention, the valuables management system further includes a repair bot configured to repair the blockchain, and after invalidation of the one block and the subsequent blocks, the repair bot repairs the blocks in the blockchain with reference to a book database managed independently of the blockchain.

As a preferred embodiment of the valuables management system according to the present invention, the division transmission unit of the colony server divides the valuables data into partial data containing data of a predetermined size from any one part of the valuables data in place of the data of the predetermined size from the beginning, and body data containing data of a remaining part other than the any one part of the valuables data in place of the data of the predetermined size +1 and thereafter.

As an embodiment of a valuables management method according to the present invention, the valuables management method is performed by a valuables management system including at least a terminal, a colony server connected through a first network to the terminal, and a center server connected through a second network to the colony server, and includes the steps of: the terminal transmitting a transaction request related to valuables to the colony server; the colony server dividing valuables data obtained or generated in response to the transaction request related to the valuables into partial data containing data of a predetermined size from a beginning, and body data containing data of the predetermined size +1 and thereafter, and transmitting the partial data to the center server; the center server encrypting the partial data; the center server generating a block that stores the encrypted partial data as an encryption key and adding the block to a blockchain; and the center server updating a block hash value of the block at predetermined intervals and transmitting the updated block hash value to the colony server, wherein the colony server updates a hash value of the body data to a block hash value transmitted from the center server at the predetermined intervals.

As a preferred embodiment of the valuables management method according to the present invention, a block in the blockchain includes a flag that indicates valid when a new block can be connected to the block, and indicates invalid when a new block cannot be connected to the block, and in the step of adding the block to the blockchain, the center server determines whether or not a flag of a destination block indicates valid when a new block is connected, generates a new block when the flag indicates valid, stores, in the new block, at least the encryption key, a block hash of the destination block, and a block hash of the new block, invalidates the flag of the destination block when the new block is connected to the destination block, and further stores, in the new block, a flag that indicates valid as an initial value.

As a preferred embodiment of the valuables management method according to the present invention, in the step of encrypting the partial data, the center server encrypts the partial data together with at least one of a filename and a transaction date and time of the valuables data, and the encryption key contains the partial data and at least one of the filename and the transaction date and time.

As a preferred embodiment of the valuables management method according to the present invention, the transaction request related to the valuables contains valuables data corresponding to the valuables uploaded from the terminal.

As a preferred embodiment of the valuables management method according to the present invention, the transaction request related to the valuables is a request to cause the colony server to generate valuables data corresponding to the valuables.

As a preferred embodiment of the valuables management method according to the present invention, the predetermined size is 30 bytes or less from the beginning of the valuables data.

As a preferred embodiment of the valuables management method according to the present invention, the first network is the Internet and the second network is a closed network.

As a preferred embodiment of the valuables management method according to the present invention, the step of the colony server dividing valuables data obtained or generated in response to the transaction request related to the valuables into partial data containing data of a predetermined size from a beginning, and body data containing data of the predetermined size +1 and thereafter, and transmitting the partial data to the center server includes dividing the valuables data into partial data containing data of a predetermined size from any one part of the valuables data in place of the data of the predetermined size from the beginning, and body data containing data of a remaining part other than the any one part of the valuables data in place of the data of the predetermined size +1 and thereafter.

As an embodiment of a colony server device according to the present invention, the colony server device includes: means for receiving a transaction request related to valuables; division transmission means for dividing valuables data obtained or generated in response to the transaction request related to the valuables into partial data containing data of a predetermined size from a beginning, and body data containing data of the predetermined size +1 and thereafter, and transmitting the partial data to the center server; and body data management means for receiving a block hash value from the center server and storing the block hash value associated with the body data as a hash value of the body data, and the hash value of the body data is updated to a block hash value transmitted from the center server at predetermined intervals.

As a preferred embodiment of the colony server device according to the present invention, the division transmission means divides the valuables data into partial data containing data of a predetermined size from any one part of the valuables data in place of the data of the predetermined size from the beginning, and body data containing data of a remaining part other than the any one part of the valuables data in place of the data of the predetermined size +1 and thereafter.

As an embodiment of a center server device according to the present invention, the center server device includes: means for receiving, from a colony server, partial data containing data of a predetermined size from a beginning of valuables data; encryption means for encrypting the partial data; blockchain management means for generating a block that stores the encrypted partial data as an encryption key and adding the block to a blockchain; and hash notification means for updating a block hash value of the block at predetermined intervals and transmitting the updated block hash value to the colony server, and the colony server stores the block hash value as a hash value of body data containing data of the predetermined size +1 and thereafter.

As a preferred embodiment of the center server device according to the present invention, the partial data contains data of a predetermined size from any one part of the valuables data in place of the data of the predetermined size from the beginning, and the body data contains data of a remaining part other than the any one part of the valuables data in place of the data of the predetermined size +1 and thereafter.

As an embodiment of a program according to the present invention, the program is performed by a computer to cause the computer to function as means of the colony server device.

As an embodiment of a program according to the present invention, the program is performed by a computer to cause the computer to function as means of the center server device.

Advantageous Effects of Invention

With the valuables management system, method, device, and program according to the present invention, the colony server stores the partial data containing the data of the predetermined size from the beginning of the valuables data received from the terminal, and the center server stores the body data containing the data of the predetermined size +1 and thereafter. Thus, the valuables data is managed in a divided manner. Also, even if the body data is leaked from the colony server through unauthorized access or the like, the body data is merely part of the valuables data, and has no value on its own. This can achieve robust security against unauthorized access.

Also, with the valuables management system and the like according to the present invention, the hash value of the partial data stored as the encryption key in one block in the blockchain managed by the center server is updated at predetermined intervals, and the hash value of the body data in the colony server is updated to the same value as that of the partial data. Then, even if the body data is leaked from the colony server through unauthorized access or the like, the hash value of the encryption key containing the partial data paired with the unauthorizedly leaked body data is updated at predetermined intervals, and thus an encryption key containing a hash value matching the hash value of the body data no longer exists. Thus, an encryption key necessary for recovering the valuables data cannot be reached by analyzing the unauthorizedly leaked body data, thereby substantially precluding recovery of the valuables data.

Further, with the valuables management system and the like according to the present invention, the center server can store only the partial data as part of the valuables data rather than the entire valuables data in the blockchain, and thus can manage the blockchain within a relatively small storage area. Thus, when forming a new block in the blockchain, the center server can perform calculation of a hash value or the like in accordance with a relatively small amount of information, thereby significantly reducing an amount of calculation using the computer. Also, the center server can be operated in reliable institutions such as governments or banks to simplify or omit verification for guaranteeing fairness of the blockchain, thereby reducing an enormous amount of calculation using the computer and power consumption along therewith.

BRIEF DESCRIPTION OF DRAWINGS

FIG. 9 shows a sequence of processing for transferring electronic currency as an example of valuables between terminals connected to the same colony server.

FIG. 16 shows a configuration of the blockchain managed by the center server.

FIG. 17A shows an outline of various types of information stored in a database of the center server.

FIG. 17B shows an outline of various types of information stored in the database of the center server.

FIG. 18 shows an outline of information stored in a database of the colony server.

FIG. 21 is a flowchart of processing for freezing a block in the blockchain.

FIG. 22 is a flowchart of processing for repairing the blockchain.

DESCRIPTION OF EMBODIMENT

Figure 1:
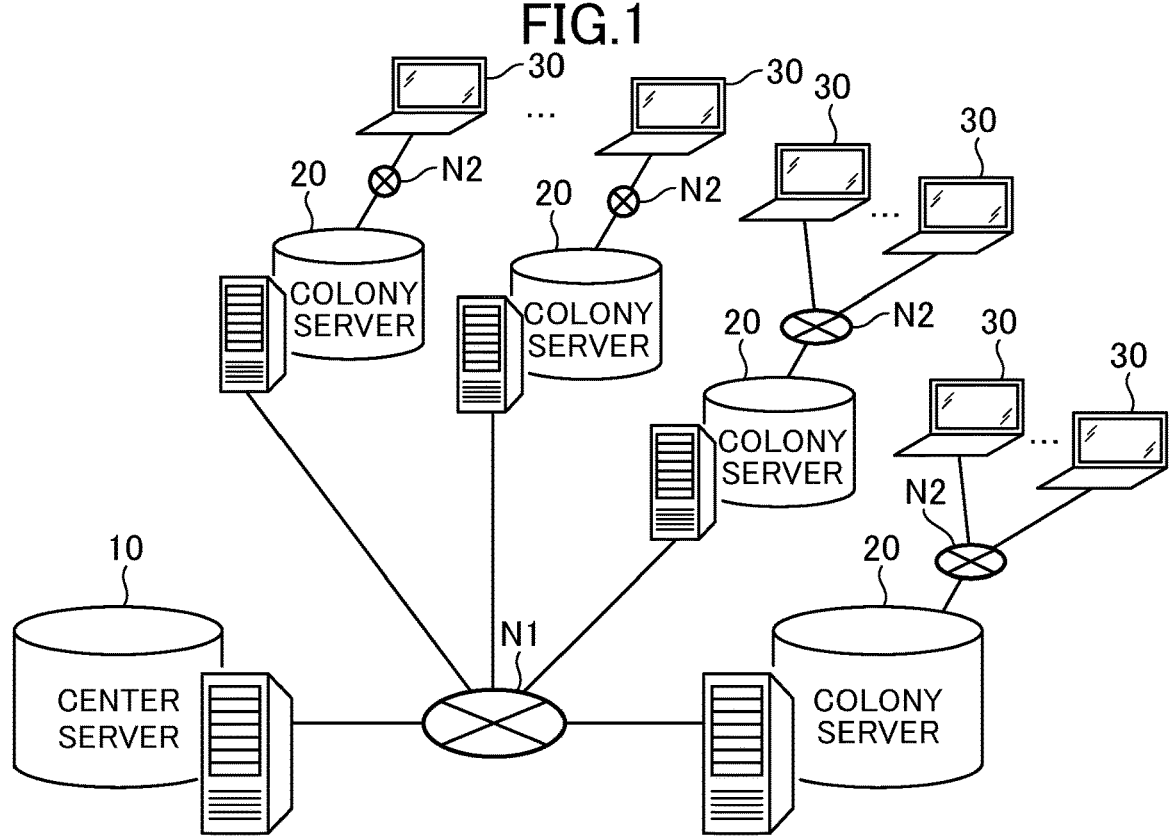
FIG. 1 is a schematic configuration diagram (system configuration diagram) of a valuables management system according to an embodiment of the present invention.

Now, with reference to the drawings, an embodiment of the present invention will be described. Throughout the drawings for illustrating the embodiment, the same components are denoted by the same reference numerals in principle, and repeated descriptions thereof are omitted. Embodiments of the present invention are not independent but may be combined as appropriate.

FIG. 1 is a system configuration diagram of a valuables management system according to an embodiment of the present invention. The valuables have financial values and are, for example, cryptocurrency, virtual currency, electronic currency, and valuable securities. The valuables management system illustratively includes a center server 10, a colony server 20, and an information processing terminal 30. The information processing terminal 30 is a terminal connectable to the Internet, such as a personal computer, a notebook computer, a smartphone, or a cellphone. The center server 10 and the colony server 20 are connected through a network N1. The network N1 is, for example, an intranet connected through a dedicated line, and is a closed network. The colony server 20 and the information processing terminal 30 are connected through a network N2. The network N2 is, for example, an open network such as the Internet. The networks N1 and N2 are not limited thereto, and a closed network or an open network may be selected as appropriate depending on a requested security level or the like.

The information processing terminal 30 can access the colony server 20 through, for example, the network N2 such as the Internet, but cannot directly access the center server 10 because of being not connected through the network N1 as the closed network to the center server 10. Only the colony server 20 connected to the information processing terminal 30 through the network N2 can access the center server 10. In the embodiment in FIG. 1, one center server 10 is shown, but a plurality of center servers 10 may be provided.

Figure 2:
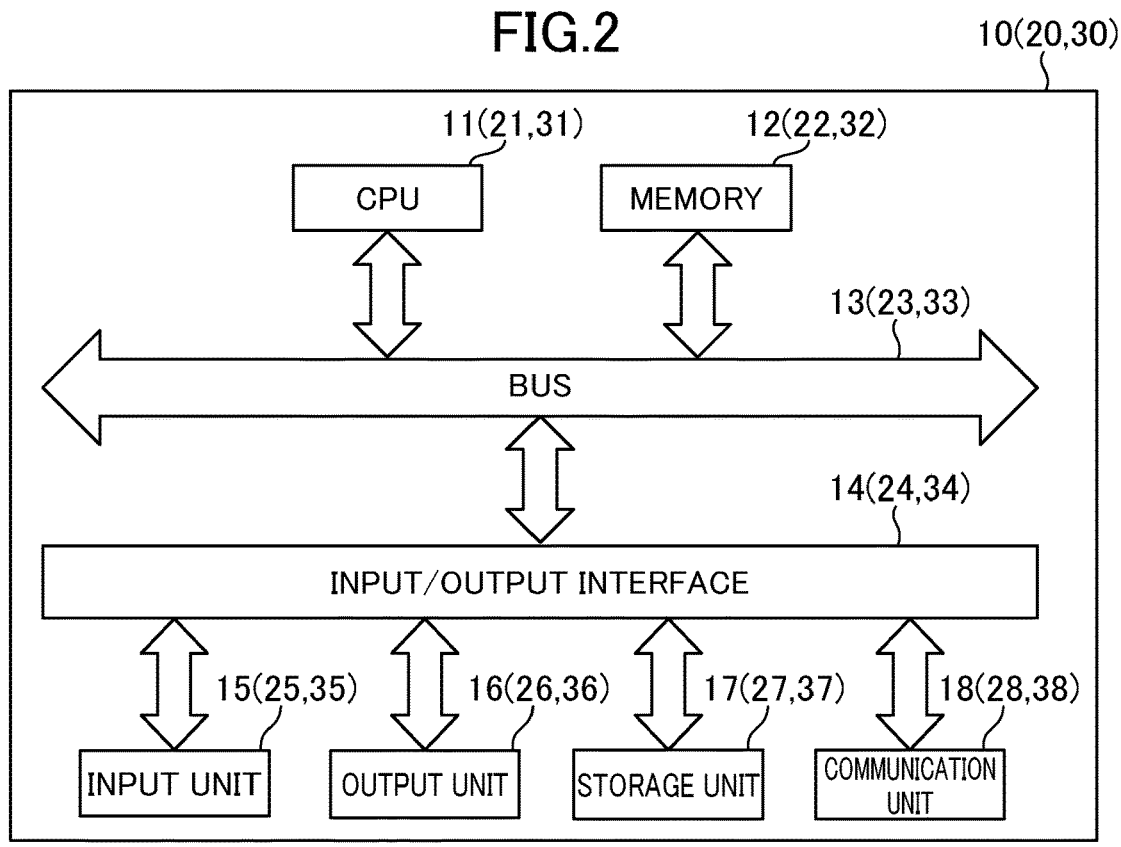
FIG. 2 is a schematic configuration diagram (block diagram) of an example of a hardware configuration of servers and an information processing terminal according to the embodiment of the present invention.

FIG. 2 is a block diagram of an example of a hardware configuration of the servers and the information processing terminal according to the embodiment of the present invention. In FIG. 2, reference numerals corresponding to hardware of the center server 10 are not in parentheses, but reference numerals corresponding to hardware of the colony server 20 and the information processing terminal 30 are in parentheses.

The center server 10 illustratively includes a central processing unit (CPU) 11, a memory 12 such as a read only memory (ROM) and a random access memory (RAM), a bus 13, an input/output interface 14, an input unit 15, an output unit 16, a storage unit 17, and a communication unit 18.

The CPU 11 performs various types of processing in accordance with a program recorded in the memory 12 or a program loaded from a storage unit 27 to the memory 12. The CPU 11 can perform, for example, a program for causing a server device to function as the center server of the present invention. Also, a function of at least part of the center server can be implemented like hardware in an application specific integrated circuit (ASIC) or the like. The same applies to the other server and the information processing terminal in the present invention.

The memory 12 stores data required for the CPU 11 to perform various types of processing, as appropriate. The CPU 11 and the memory 12 are connected through the bus 13. The input/output interface 14 is also connected to the bus 13. The input unit 15, the output unit 16, the storage unit 17, and the communication unit 18 are connected to the input/output interface 14.

The input unit 15 is constituted by various buttons, a touch panel, a microphone, or the like, and inputs various types of information in accordance with an instruction operation by an administrator or the like of the center server 10. The input unit 15 may be realized by an input device such as a keyboard or a mouse independent of a body housing other units of the center server 10.

The output unit 16 is constituted by a display, a speaker, or the like, and outputs image data or audio data. The image data or audio data output by the output unit 16 is output from the display or the speaker so as to be recognizable as an image or music by a player.

The storage unit 17 is constituted by a semiconductor memory such as a dynamic random access memory (DRAM) and stores various types of data.

The communication unit 18 achieves communication with other devices. For example, the communication unit 18 communicates with the colony server 20 through the network N1.

The center server 10 includes a drive (not shown) as required. To the drive, a removable medium constituted by, for example, a magnetic disk, an optical disk, a magnetooptical disk, or a semiconductor memory is mounted as appropriate. The removable medium stores a program for conducting a cryptocurrency transaction, or various types of data such as text data or image data. The program or various types of data such as image data read from the removable medium by the drive is installed in the storage unit 17 as required.

Next, a hardware configuration of the colony server 20 will be described. As shown in FIG. 2, the colony server 20 illustratively includes a CPU 21, a memory 22, a bus 23, an input/output interface 24, an input unit 25, an output unit 26, a storage unit 27, and a communication unit 28. These units have the same functions as the units of the same names with different reference numerals included in the center server 10. Thus, overlapping descriptions will be omitted. The same applies to the information processing terminal 30. When the information processing terminal 30 is a portable device, hardware of the information processing terminal 30 and a display and a speaker may be integrated.

Figure 3:
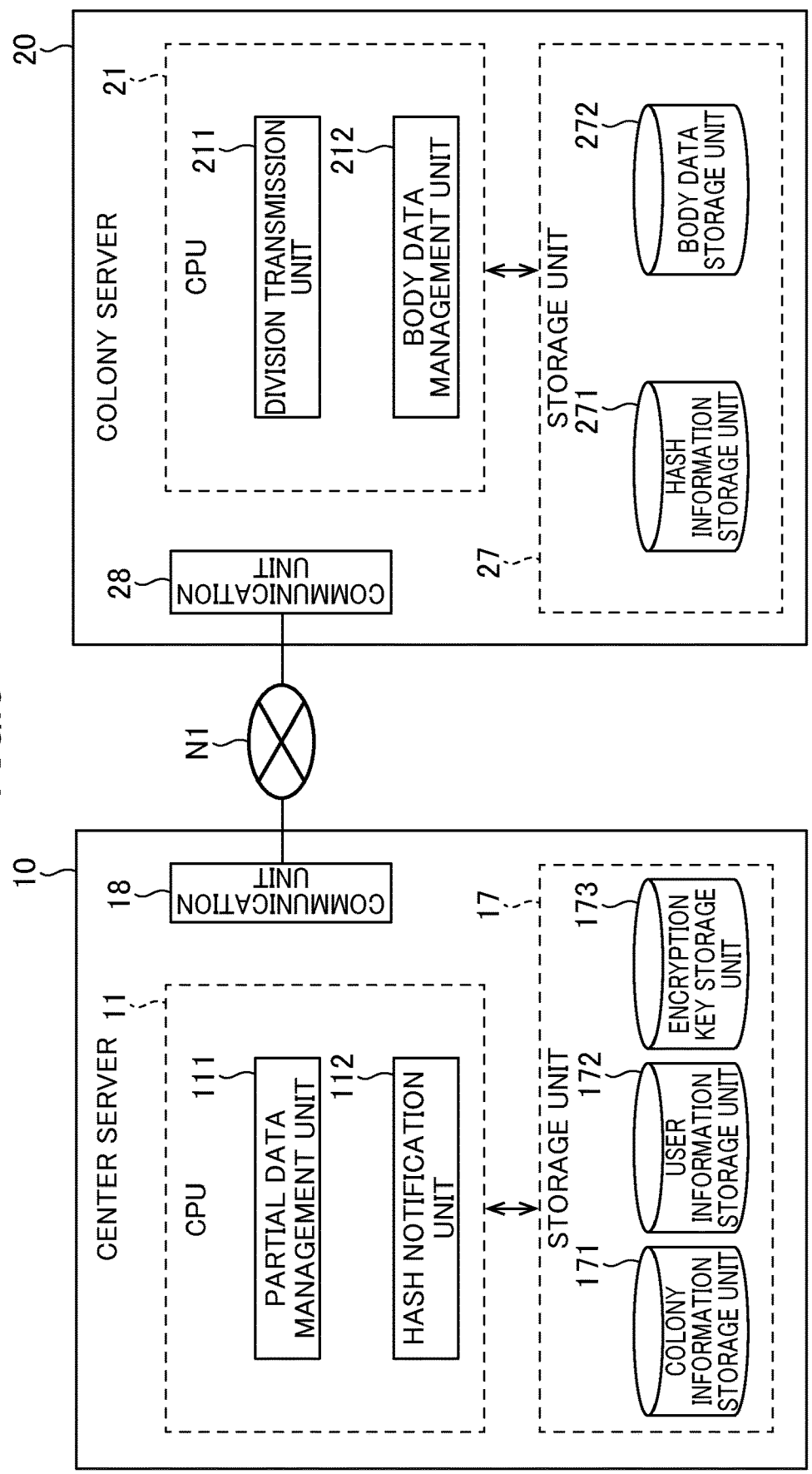
FIG. 3 is a schematic configuration diagram (block diagram) of a center server and a colony server according to the embodiment of the present invention.

With reference to FIG. 3, functional configurations of the center server 10 and the colony server 20 that constitute the valuables management system will be described. FIG. 3 is a block diagram of the center server and the colony server according to the embodiment of the present invention. When the center server 10 perform a program for valuables management on the center server side, a partial data management unit 111 and a hash notification unit 112 function in the CPU 11. A colony information storage unit 171, a user information storage unit 172, and an encryption key storage unit 173 are set in a partial storage area of the storage unit 17. Details of information stored in the colony information storage unit 171, the user information storage unit 172, and the encryption key storage unit 173 will be described later.

The partial data management unit 111 of the center server 10 can encrypt partial data as part of valuables data transmitted from the colony server 20, generate a block that stores the encrypted partial data as an encryption key, and add the block to a blockchain. The partial data management unit 111 may encrypt the partial data together with at least one of a filename and a transaction date and time of the valuables data, and the encryption key may contain the partial data and at least one of the filename and the transaction date and time.

The hash notification unit 112 can update a block hash value of the block that stores the encryption key at predetermined intervals, ad transmit the updated block hash value to the colony server. The predetermined interval may be 24 hours or shorter, and may be, for example, 1 hour, 6 hours, 12 hours, 24 hours, or the like. The predetermined interval may be longer than 24 hours.

When the colony server 20 performs a program for valuables management on the colony server side, a division transmission unit 211 and a body data management unit 212 function in the CPU 21. A hash information storage unit 271 and a body data storage unit 272 are set in a partial storage area of the storage unit 27. Details of information stored in the hash information storage unit 271 and the body data storage unit 272 will be described later.

The division transmission unit 211 in the colony server 20 can divide valuables data obtained or generated in response to the transaction request related to the valuables from the information processing terminal 30 into partial data containing data of a predetermined size from a beginning, and body data containing data of the predetermined size +1 and thereafter, and transmit the partial data to the center server 10. The predetermined size may be, for example, 30 bytes or less from the beginning of the valuables data. The predetermined size is not limited thereto, and may be set as appropriate.

The division transmission unit 211 may also divide the valuables data into partial data containing data of a predetermined size from any one part of the valuables data in place of the data of the predetermined size from the beginning, and body data containing data of a remaining part other than the any one part of the valuables data (that is, the partial data) in place of the data of the predetermined size +1 and thereafter.

The body data management unit 212 can receive the block hash value from the center server 10 and store the block hash value associated with the body data as a hash value of the body data.

Figure 4:
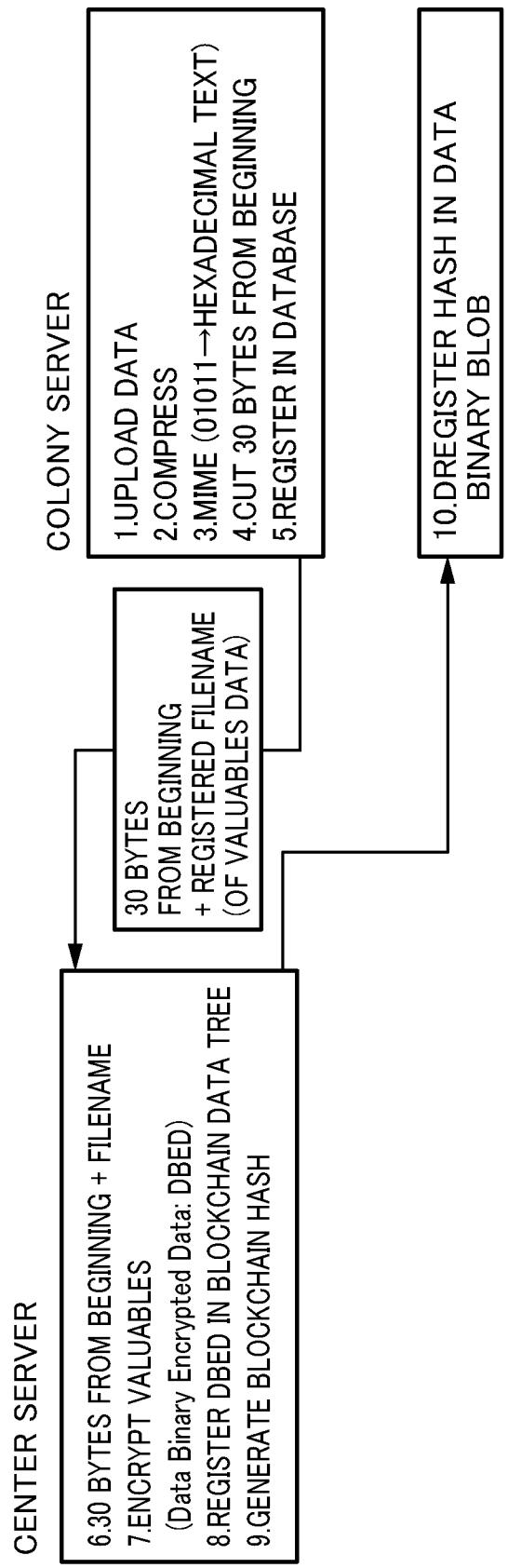
FIG. 4 shows an example of a data processing procedure of the center server and the colony server.

FIG. 4 shows an example of a data processing procedure of the center server and the colony server. First, the colony server 20 uploads valuables data from the user's information processing terminal 30 (or the colony server 20 generates valuables data) (step 1), compresses the valuables data (step 2), and replaces a bit string of 0 and 1 in the compressed data corresponding to the valuables data with hexadecimal text data in accordance with Multipurpose Internet Mail Extensions (MIME) (step 3). In the example in FIG. 4, the valuables data is compressed, but not limited thereto, the valuables data needs not be compressed. MIME is a standard to extend email standards through the Internet so as to handle various formats.

Then, the colony server 20 cuts, for example, 30 bytes from a beginning of the hexadecimal text data corresponding to the valuables data as partial data (step 4), and registers (stores) data of 31 bytes and thereafter as body data in a database (for example, the body data storage unit 272) (step 5).

Then, the colony server 20 transmits the partial data (data of 30 bytes from the beginning) together with a registration filename of the valuables data to the center server 10. The center server 10 receives the partial data (data of 30 bytes from the beginning) and the filename of the valuables data (step 6), and encrypts the valuables data in accordance with the data and the filename (step 7). For example, the center server 10 encrypts the valuables data and generates an encryption key (also referred to as data binary encrypted data (DBED)). The center server 10 adds (registers) the encryption key (DBED) as one block of a blockchain (or a blockchain data tree) (step 8), and generates a blockchain hash, that is, calculates a block hash value of the block added to the blockchain (step 9). Finally, the center server 10 transmits the block hash value to the colony server 20, and the colony server 20 registers the block hash value that is binary data as a binary large object (BLOB) in a database (for example, the hash information storage unit 271) (step 10).

Figure 5:
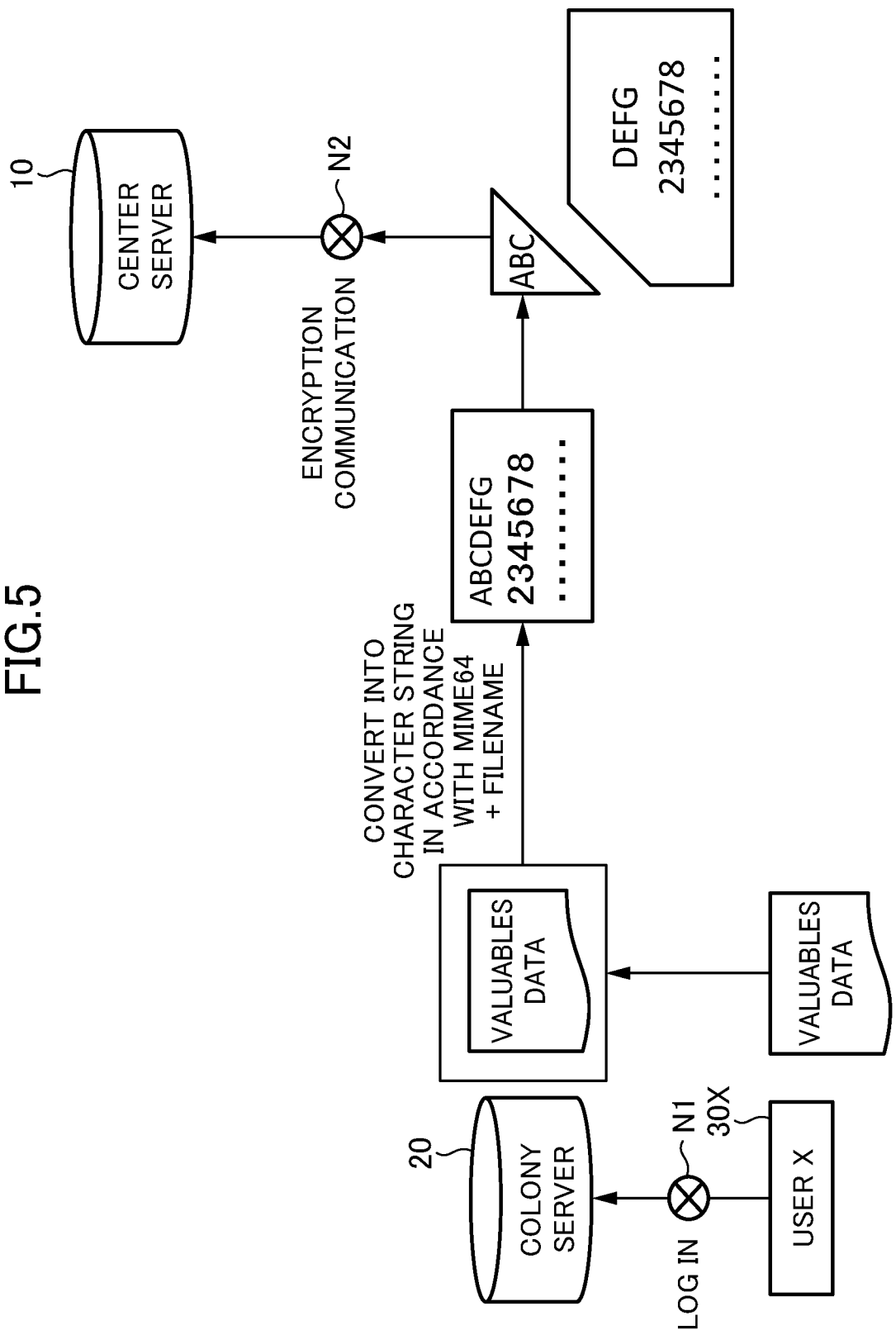
FIG. 5 shows an outline of registration of valuables data from the colony server to the center server.

FIG. 5 shows an outline of registration of the valuables data from the colony server to the center server. A user X uses an information processing terminal 30X to log in the colony server 20 and upload the valuables data to the colony server 20 through the network N1. As described above, the valuables data uploaded to the colony server 20 is converted into a character string of, for example, ABCDEFG2345678 in accordance with MIME (for example, MIME64), and passed to a next process together with the filename of the valuables data. The colony server 20 divides the valuables data converted into the character string into partial data (for example, ABC) of a predetermined size from a beginning, and body data of the predetermined size +1 and thereafter (for example, DEFG2345678), and transmits the partial data together with the filename to the center server 10 by encryption communication through the network N2. In the examples in FIGS. 4 and 5, the data of the predetermined size from the beginning of the valuables data converted into the character string is the partial data, and the subsequent data is the body data, but not limited thereto. The partial data may contain data of a predetermined size from any one part of the valuables data in place of the data of the predetermined size from the beginning, and the body data may contain data of a remaining part other than the any one part of the valuables data in place of the data of the predetermined size +1 and thereafter.

As such, with the valuables management system according to the embodiment of the present invention, the colony server 20 stores the partial data containing the data of the predetermined size from the beginning of the valuables data received from the information processing terminal 30, and the center server 10 stores the body data containing the data of the predetermined size +1 and thereafter. Thus, the valuables data is managed in a divided manner. Also, even if the body data is leaked from the colony server 20 through unauthorized access or the like, the body data is merely part of the valuables data, and has no value on its own. This can achieve robust security against unauthorized access.

Also, with the valuables management system according to the embodiment of the present invention, the center server 10 can store only the partial data as part of the valuables data rather than the entire valuables data in the blockchain, and thus can manage the blockchain within a relatively small storage area. Thus, when forming a new block in the blockchain, the center server 10 can perform calculation of a hash value or the like in accordance with a relatively small amount of information, thereby significantly reducing an amount of calculation using the computer such as the center server 10. Also, the center server 10 can be operated in reliable institutions such as governments or banks to simplify or omit verification for guaranteeing fairness of the blockchain, thereby reducing an enormous amount of calculation using the computer and power consumption along therewith.

Figure 6:
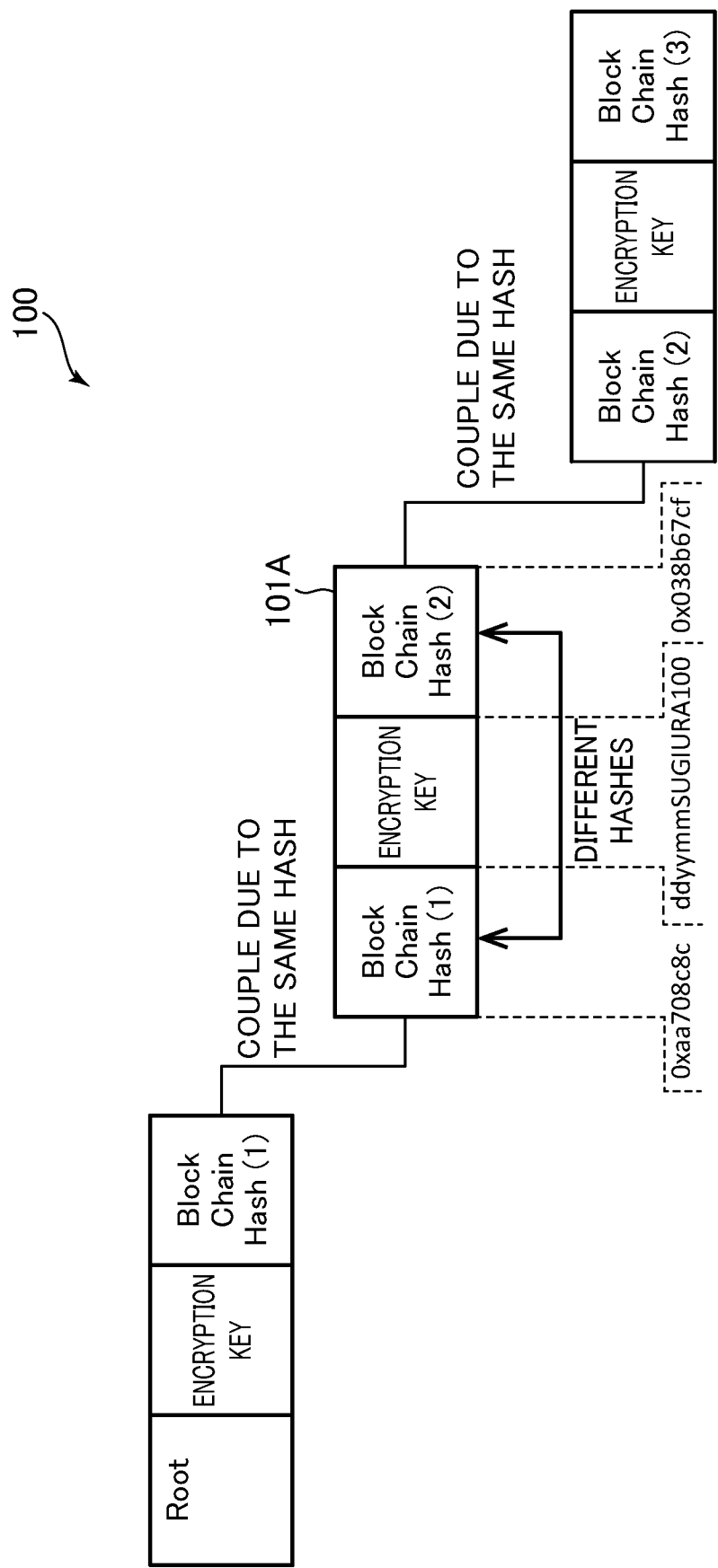
FIG. 6 schematically shows an outline of a basic configuration of a blockchain managed by the center server.

FIG. 6 shows an outline of a basic configuration of a blockchain managed by the center server. One block 101A of a blockchain 100 contains two different block hash values (Block Chain Hash(1) and Block Chain Hash (2), for example, 0xaa708c8c and 0x038b67cf), and an encryption key (for example, ddyymmSUGIURA100) encrypting partial data of valuables data. One block hash value (Block Chain Hash (1)) is the same as a block hash value of a preceding block, and the block 101A is coupled to the preceding block due to the same hash value. Similarly, the other block hash value (Block Chain Hash (2)) is the same as a block hash value of a following block, and the block 101A is also coupled to the following block due to the same hash value.

Figure 7:
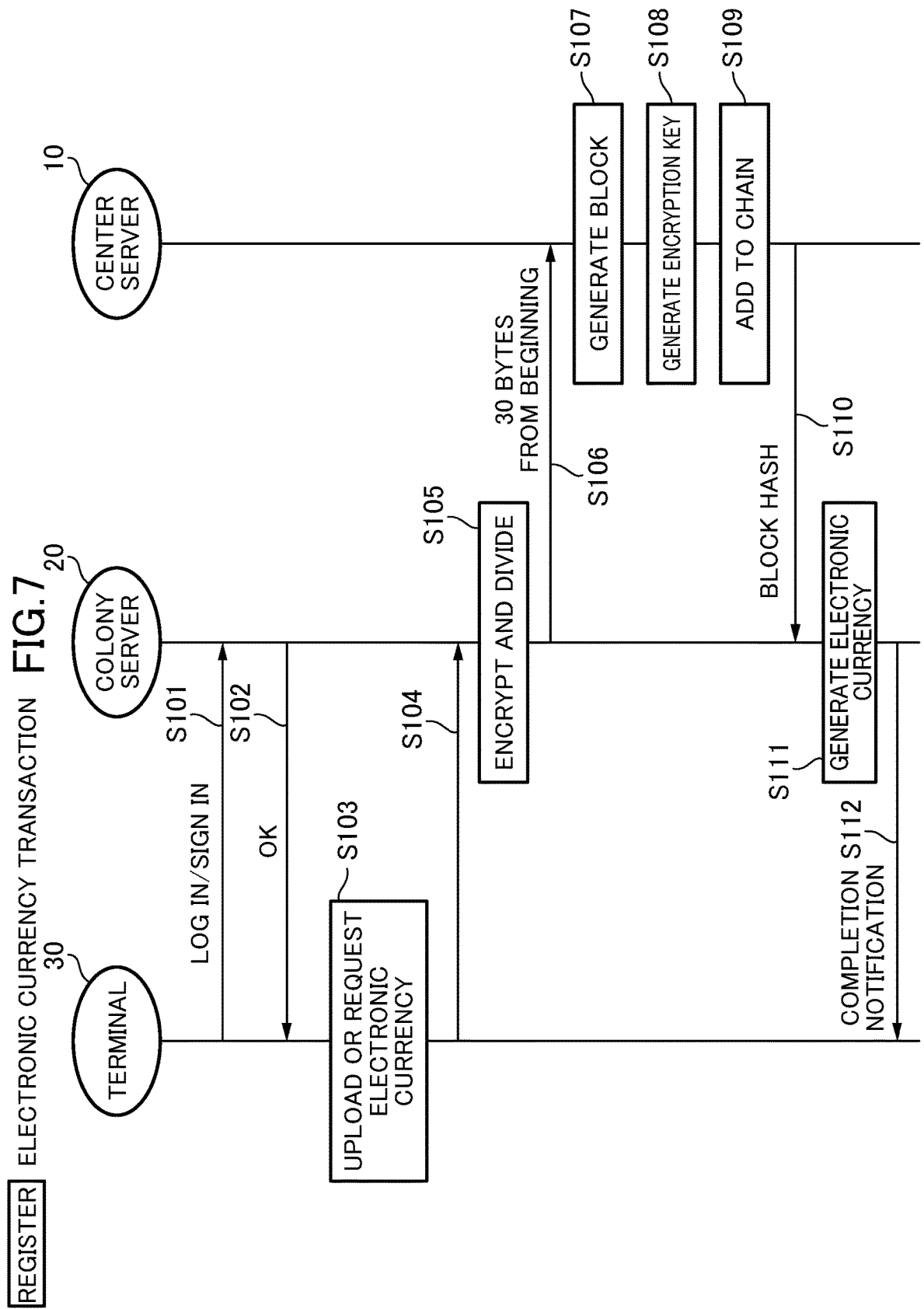
FIG. 7 shows a sequence of processing for registering electronic currency as an example of valuables in the center server.

FIG. 7 shows a sequence of processing for registering electronic currency as an example of valuables in the center server. A user uses the information processing terminal 30 to log in (sign in) and access the colony server 20, for example, through the Internet (step S101). When the login using the user's information processing terminal 30 is successful, the colony server 20 transmits a response of "login success (OK)" to the information processing terminal 30 (step S102). Then, the user selects, on the information processing terminal 30, upload of electronic currency data as one of valuables data or request for generation of the electronic currency data (step S103), and uploads the electronic currency data to the colony server 20 or transmits a request for generation of the electronic currency data (step S104). As described above, the colony server 20 performs encryption of the uploaded or generated electronic currency data, such as compression or conversion into a character string. For example, the colony server 20 divides the electronic currency data into partial data of 30 bytes from a beginning and body data of 31 bytes and thereafter, and transmits the partial data of 30 bytes from the beginning to the center server 10 (step S106).

The center server 10 generates one block to be added to a blockchain (step S107), encrypts the partial data of 30 bytes from the beginning and at least one of a transaction date and time (for example, an upload date and time or a generation date and time) of electronic currency and a filename of the electronic currency data, and generates an encryption key containing the partial data and at least one of the filename and the transaction date and time (step S108). In this embodiment, the transaction date and time and the filename are used in addition to the partial data for encryption, but not limited thereto, other character strings, data (for example, a user's login ID or a password), or the like may be used.

The center server 10 adds the generated block containing the encryption key to the blockchain (step S109), and transmits a block hash value of the added block to the colony server 20 (step S110). The colony server 20 stores the received block hash value together with body data in the database (body data storage unit 272), and generates electronic currency without the partial data (step S111). Finally, when completing the generation of the electronic currency, the colony server 20 transmits completion notification to the information processing terminal 30 (step S112).

Figure 8:
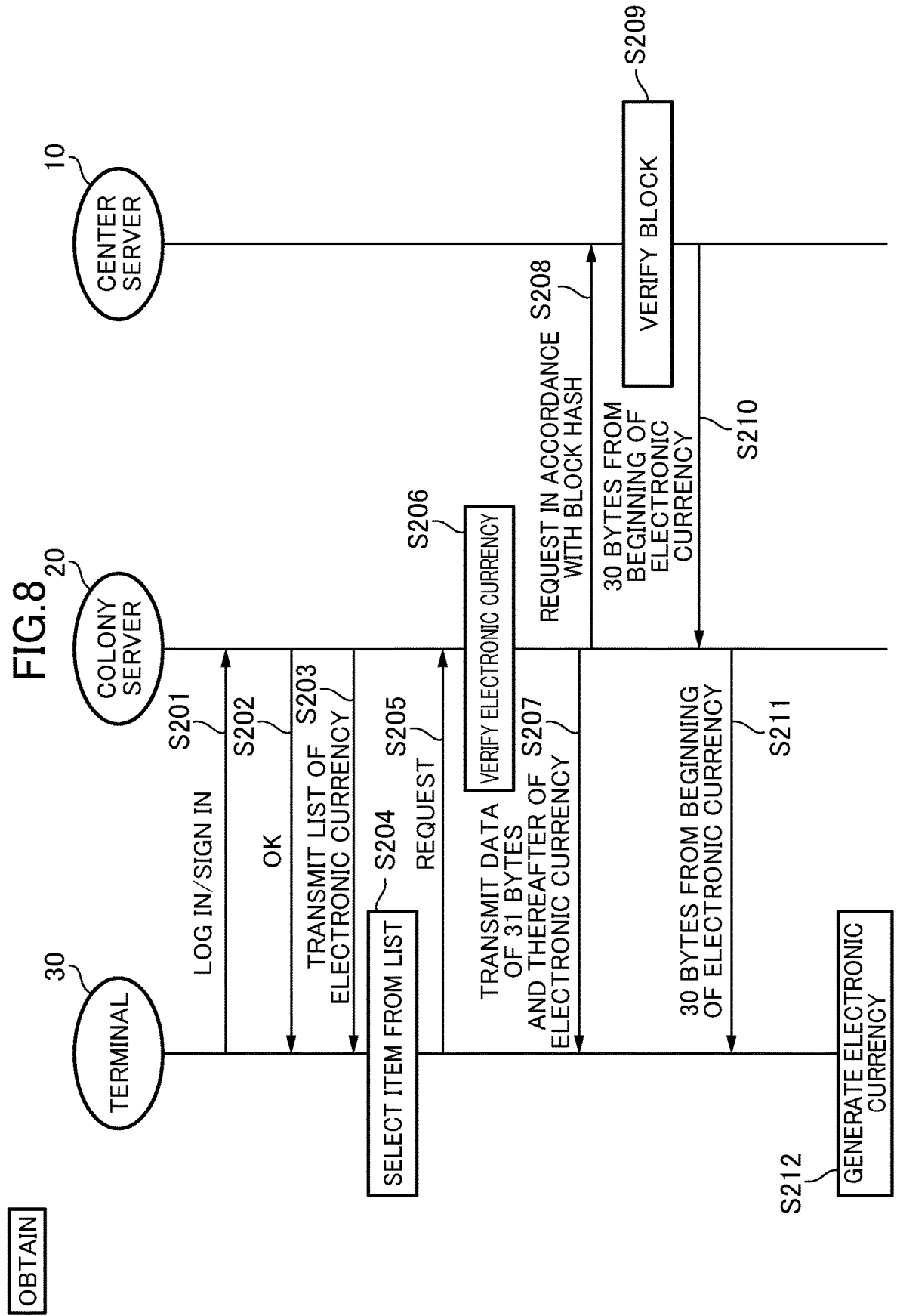
FIG. 8 shows a sequence of processing for obtaining electronic currency as an example of valuables from the center server.

FIG. 8 shows a sequence of processing for obtaining electronic currency as an example of valuables from the center server. A user uses the information processing terminal 30 to log in (sign in) and access the colony server 20, for example, through the Internet (step S201). When the login using the user's information processing terminal 30 is successful, the colony server 20 transmits a response of "login success (OK)" to the information processing terminal 30 (step S202), and also transmits a list of electronic currency or the like (step S203).

The user selects an item required for obtaining electronic currency from the list of electronic currency or the like displayed on a screen of the information processing terminal 30 (step S204), and the information processing terminal 30 transmits a request for obtaining electronic currency together with the item selected by the user to the colony server 20 (step S205). The colony server 20 identifies and verifies the requested electronic currency (body data corresponding thereto) from the database in response to the request from the information processing terminal 30 (step S206). If no problem is found in a verification result, the colony server 20 transmits body data containing data of 31 bytes and thereafter of the electronic currency to the information processing terminal 30 (step S207), and makes a request for partial data corresponding to the body data to the center server 10 in accordance with a block hash value associated with the body data and stored (step S208).

The center server 10 verifies a block in the blockchain in response to the request (step S209), recovers, from an encryption key, partial data of 30 bytes from a beginning of electronic currency data, and transmits the partial data to the colony server 20 (step S210). The colony server 20 transmits the received partial data to the information processing terminal 30 (step S211), and the information processing terminal 30 couples the received partial data to the body data to generate electronic currency data (step S212).

FIG. 9 shows a sequence of processing for transferring electronic currency as an example of valuables between terminals connected to the same colony server. When a user X of an information processing terminal 30X transfers electronic currency to a user Y of an information processing terminal 30Y, the terminals 30X and 30Y being connected to the same colony server 20, the user X uses the information processing terminal 30X to log in (sign in) and access the colony server 20, for example, through the Internet (step S301). When the login using the user's information processing terminal 30X is successful, the colony server 20 transmits a response of "login success (OK)" to the information processing terminal 30X (step S302), and also transmits a list of electronic currency or the like (step S303).

The user X selects an item required for transferring electronic currency from the list of electronic currency or the like displayed on a screen of the information processing terminal 30X (step S304), inputs a user ID of the user Y as a transferee (step S305), and transmits a request for transfer to the colony server 20 (step S306).

The colony server 20 verifies the user ID of the transferee (step S307). If no problem is found, the colony server 20 generates a download URL (step S308), makes a request for an email address of the user Y as the transferee to the center server 10 (step S309), and obtains the email address together with a response (OK) (step S310). The colony server 20 emails the download URL to the obtained email address (information processing terminal 30Y) (step S311).

The user Y as the transferee checks the email on the information processing terminal 30Y, logs in the colony server 20 using the download URL, and downloads body data containing data of 31 bytes and thereafter of electronic currency (step S312). When the body data is downloaded, the colony server 20 transmits a block hash value of the body data to the center server 10 (step S313). The center server 10 identifies a block having a hash value matching the received hash value in the blockchain, and verifies electronic currency contained in the block (step S314). If a verification result is correct, the center server 10 transmits partial data containing data of 30 bytes from a beginning of the electronic currency to the colony server 20 (step S315), and the colony server 20 transmits the received partial data to the information processing terminal 30Y (step S316). Finally, the information processing terminal 30Y couples the received partial data to the body data to generate electronic currency data (step S317).

Figure 10:
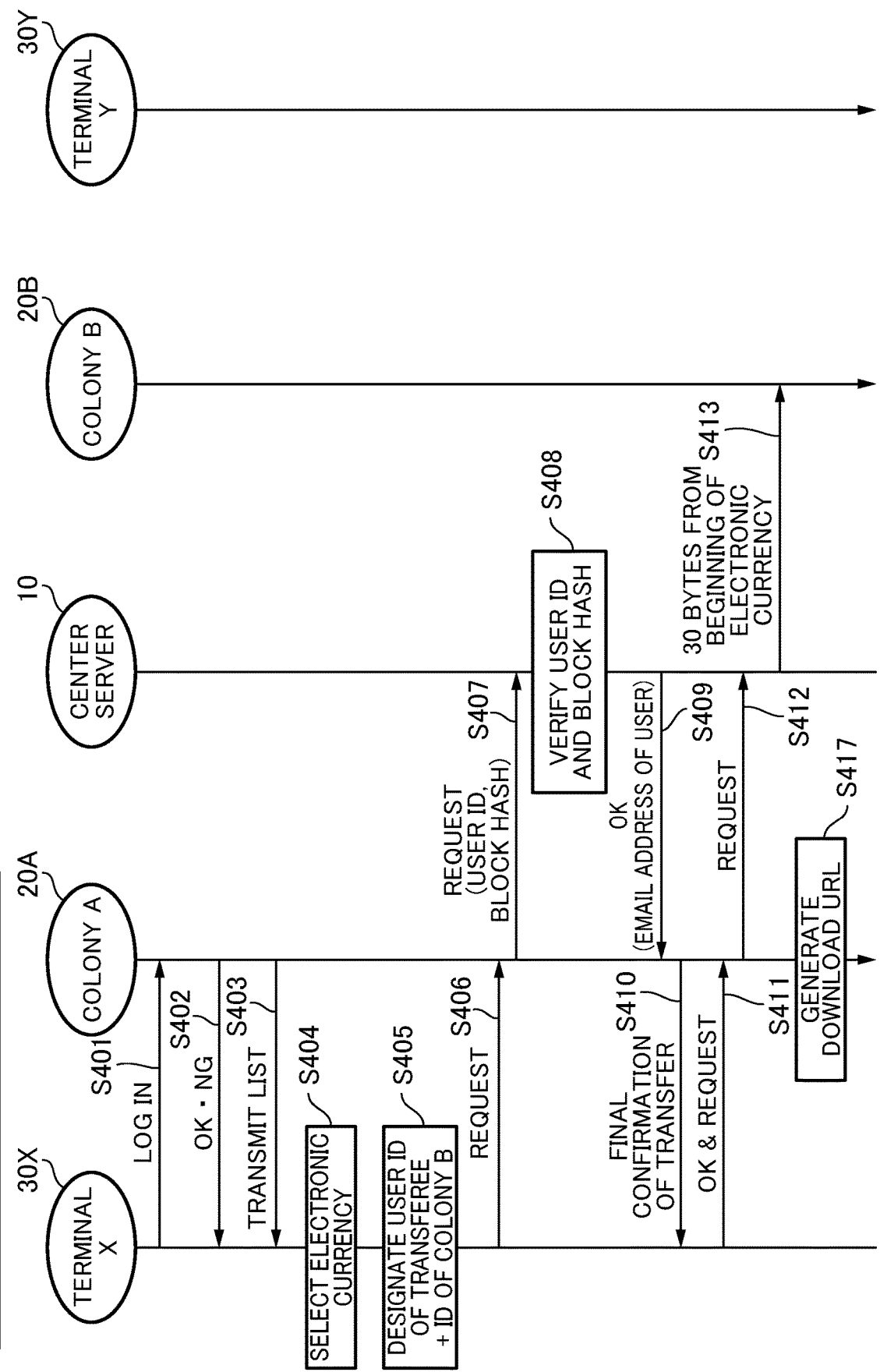
FIG. 10 shows a sequence of processing for transferring electronic currency as an example of valuables between terminals connected to different colony servers.
Figure 11:
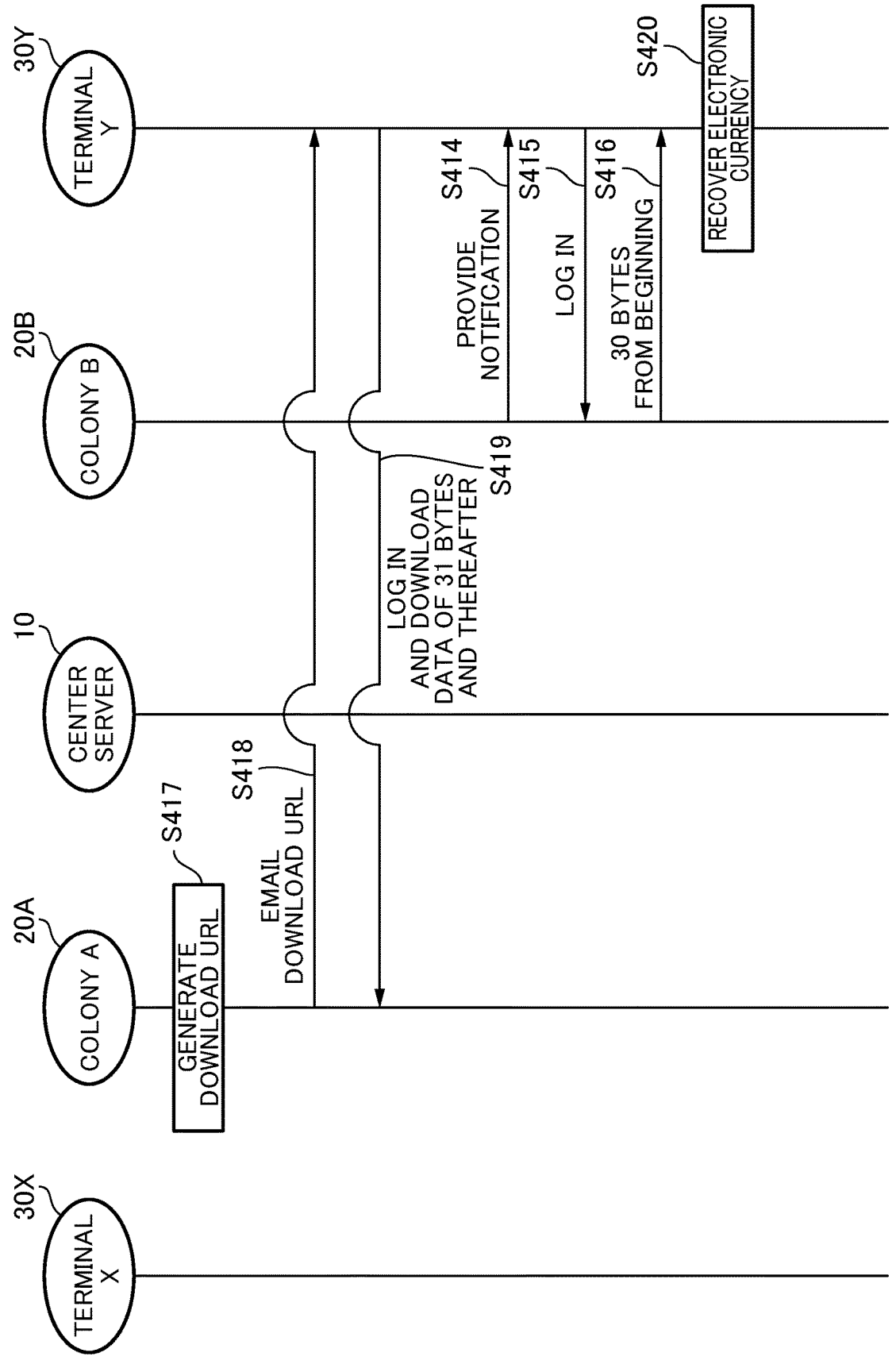
FIG. 11 shows the sequence of processing for transferring electronic currency as an example of valuables between terminals connected to different colony servers.

FIGS. 10 and 11 show a sequence of processing for transferring electronic currency as an example of valuables between terminals connected to different colony servers. FIGS. 10 and 11 together show a sequence of processing for transferring electronic currency from an information processing terminal 30X connected to a colony server 20A (colony A) to an information processing terminal 30Y connected to a colony server 20B (colony B).

First, with reference to FIG. 10, a user X uses the information processing terminal 30X to log in (sign in) and access the colony server 20A, for example, through the Internet (step S401). When the login using the user's information processing terminal 30X is successful, the colony server 20A transmits a response of "login success (OK)" to the information processing terminal 30X (or when the login is unsuccessful, the colony server 20A transmits a response of "login failure (NG)" to the information processing terminal 30X) (step S402), and transmits a list of electronic currency or the like (step S403).

The user X selects an item required for transferring electronic currency from the list of electronic currency or the like displayed on a screen of the information processing terminal 30X (step S404), designates a user ID of a user Y as a transferee and an ID of the colony server 20B (step S405), and transmits a request for transfer to the colony server 20A (step S406). The colony server 20A identifies body data of the requested electronic currency, and transmits a request containing a block hash value of the body data and the user ID of the user Y as the transferee to the center server 10 (step S407).

The center server 10 verifies the received user ID and the block hash value (step S408). If a verification result is correct, the center server 10 transmits a response (OK) of that fact and an email address of the user Y as the transferee to the colony server 20A, (step S409), and the colony server 20 transmits a final confirmation of whether or not to transfer the electronic currency to the information processing terminal 30X (step S410). The information processing terminal 30X transmits a response (OK) of approval of transfer and a final request for transfer to the colony server 20A, (step S411), and the colony server 20A transmits the request to the center server 10 (step S412).

The center server 10 transmits partial data containing data of 30 bytes from a beginning of the electronic currency to the colony server 20B (step S413). With reference to FIG. 11, the colony server 20B provides notification of the transfer of the electronic currency from the user X to the information processing terminal 30Y of the user Y as the transferee (step S414). The user Y uses the information processing terminal 30Y to log in and access the colony server 20B in accordance with the notification displayed on a screen of the information processing terminal 30Y (step S415), and the information processing terminal 30Y receives the partial data containing data of 30 bytes from the beginning of the electronic currency transmitted from the center server 10 (step S416).

Again with reference to FIG. 10, the colony server 20A generates an URL for downloading body data containing data of 31 bytes and thereafter of the electronic currency immediately after or substantially simultaneously with transmitting the request to the center server 10 (step S417). With reference to FIG. 11, after generating the download URL (step S417), the colony server 20A emails the download URL to the information processing terminal 30Y (step S418). The user Y as the transferee checks the email on the information processing terminal 30Y, logs in the colony server 20A using the download URL, and downloads the body data containing the data of 31 bytes and thereafter of the electronic currency (step S419). Finally, the information processing terminal 30Y couples the received partial data to the body data to generate electronic currency data (step S420).

Figure 12:
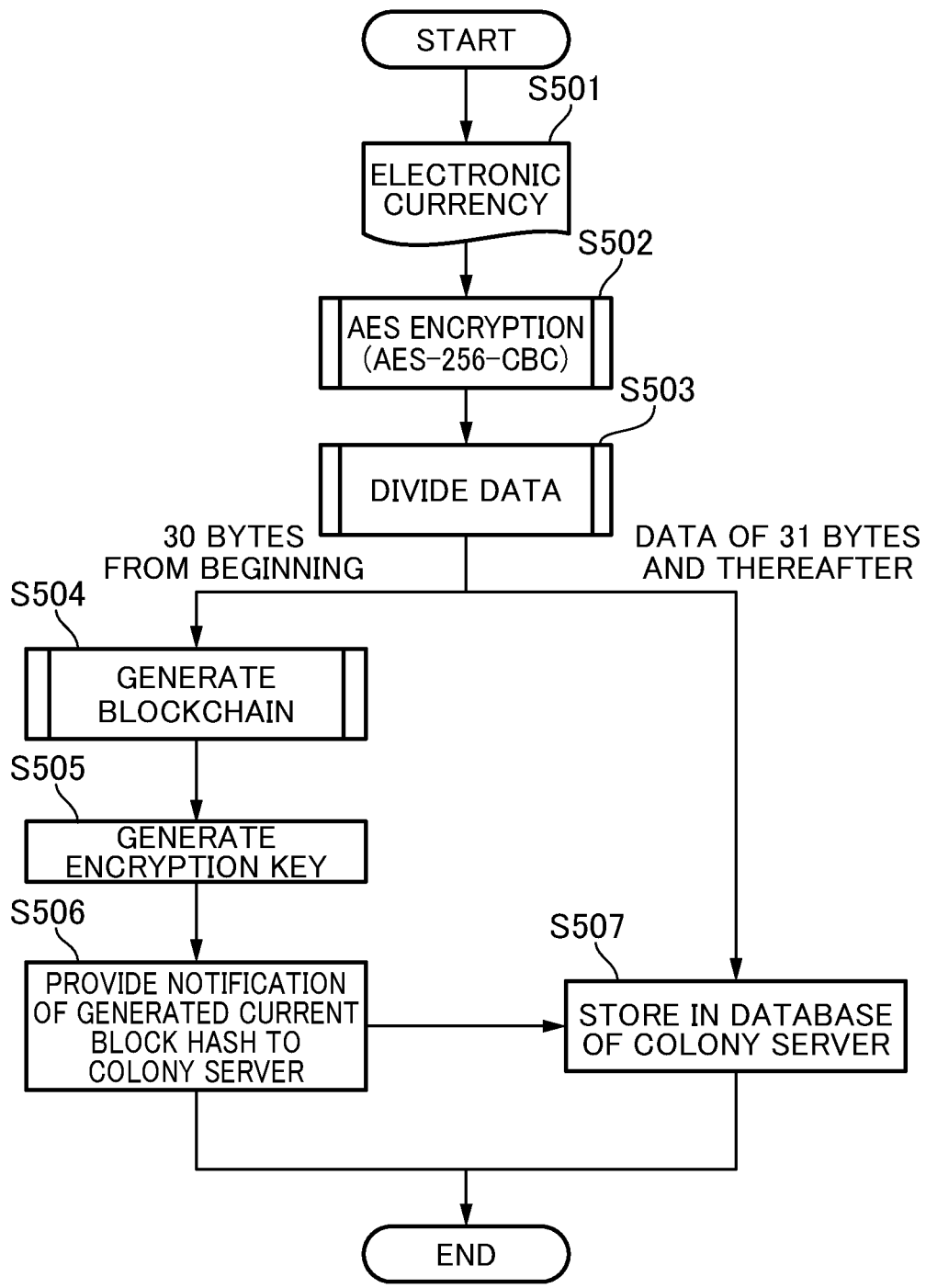
FIG. 12 is a flowchart of processing for dividing electronic currency as an example of valuables into an encryption key and body data in the entire valuables management system.

FIG. 12 is a flowchart of processing for dividing electronic currency as an example of valuables into an encryption key and body data in the entire valuables management system. When handling electronic currency data as an example of valuables data, the information processing terminal 30 uploads the electronic currency to the colony server 20 (step S501), and the colony server 20 encrypts the electronic currency data (step S502). For example, AES encryption (AES-256-CBC) can be used. The valuables data may be encrypted by a method using compression or MIME as shown in FIGS. 4 and 5, or other encryption methods.

The colony server 20 divides the encrypted electronic currency data into partial data of a predetermined size and body data containing data of a remaining part other than the partial data (step S503). For example, the partial data may contain data of 30 bytes from a beginning of the encrypted electronic currency data and the body data may contain data of 31 bytes to an end, but not limited thereto.

Figure 13:
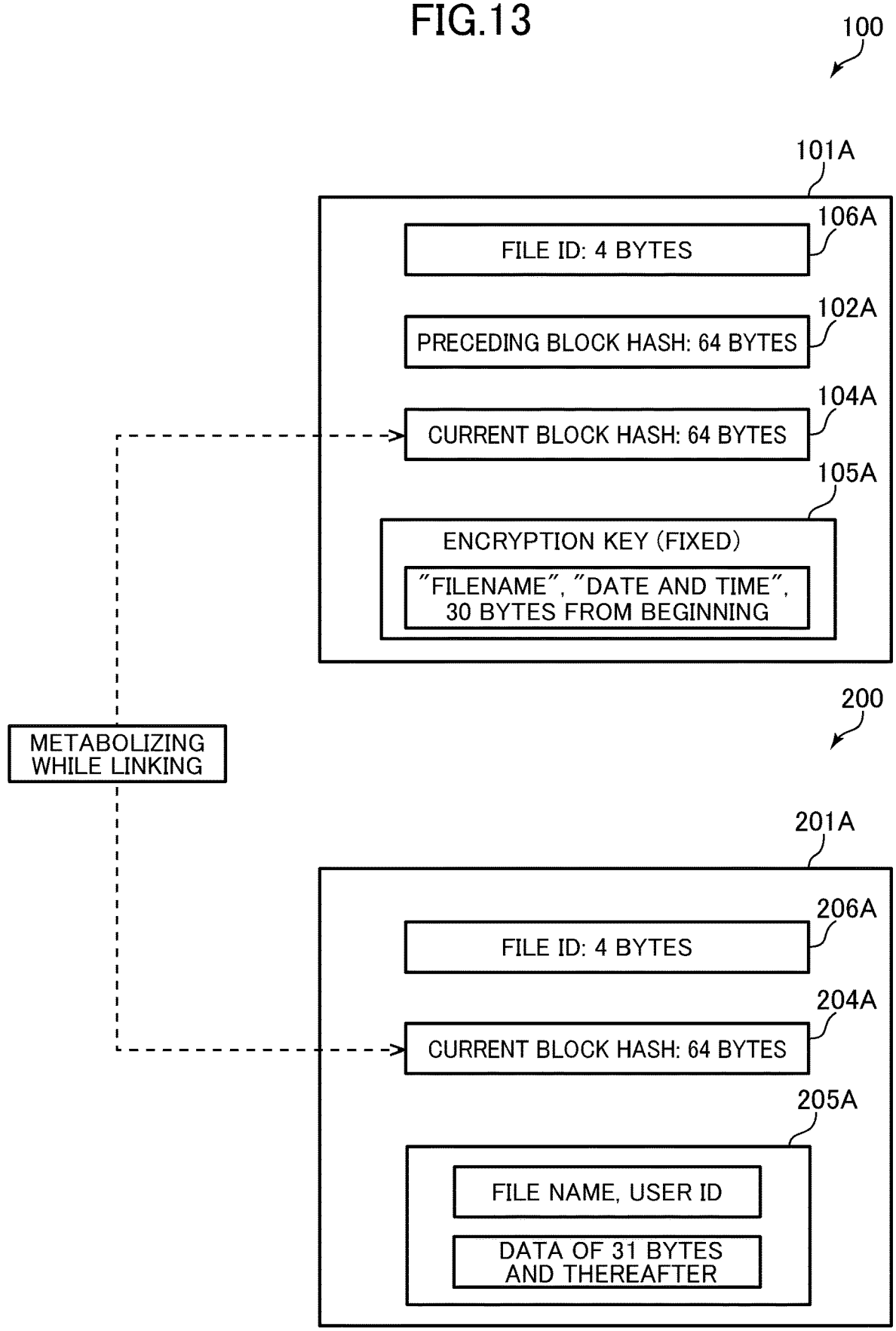
FIG. 13 shows a relationship between one block in the blockchain accessible by the center server and body data accessible by the colony server.
Figure 14:
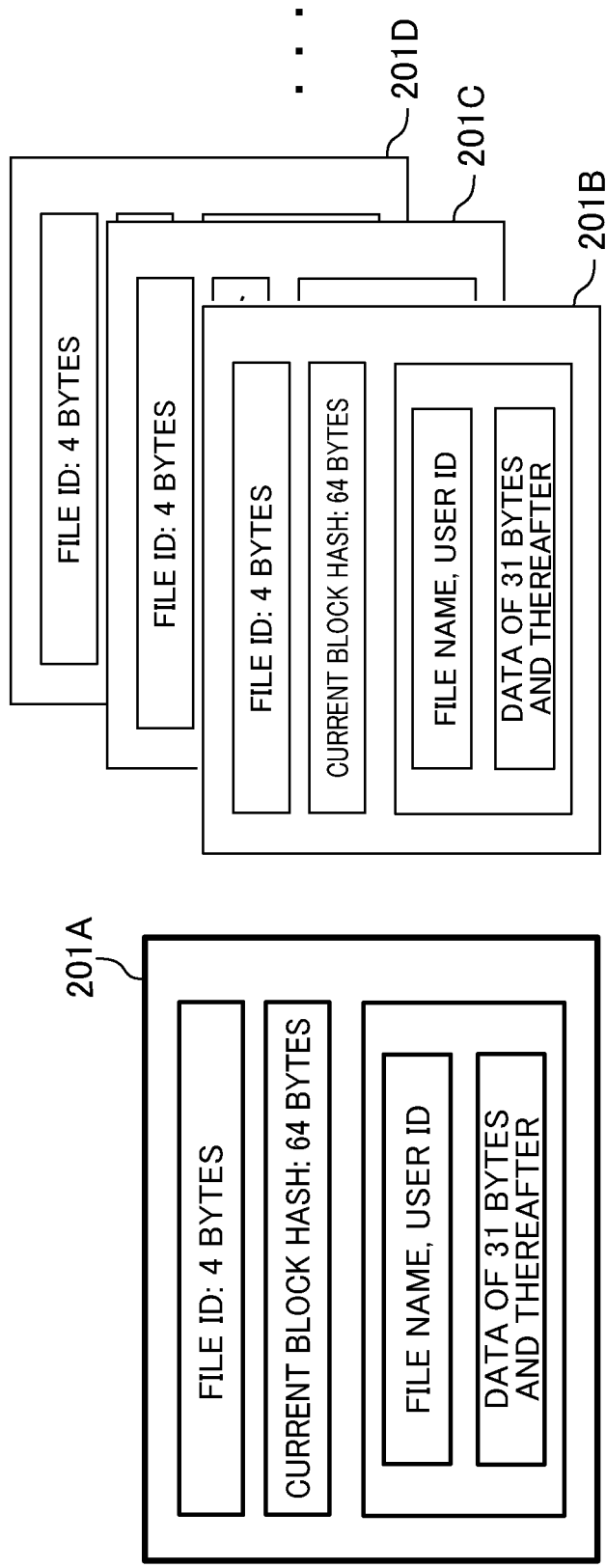
FIG. 14 shows an outline of the body data independently stored in the colony server.

The center server 10 generates one block in a blockchain for storing the partial data (for example, the data of 30 bytes from the beginning) (step S504), generates an encryption key containing the partial data (step S505), and provides notification of a generated current block hash value to the colony server 20 (step S506). The colony server 20 stores the hash value in the database (hash information storage unit 271) (step S507). FIGS. 13 and 14 show details of the blockchain containing the partial data generated in the valuables management system and the body data.

FIG. 13 shows a relationship between one block in the blockchain accessible by the center server and the body data accessible by the colony server. FIG. 14 shows an outline of the body data independently stored in the colony server. FIG. 13 more specifically shows the outline of the blockchain 100 shown in FIG. 6. One block 101A in the blockchain 100 stored in a database (encryption key storage unit 173) of the center server 10 contains at least, for example, a hash value 102A of a preceding block, a hash value 104A of a current block, and an encryption key 105A. The hash values 102A and 104A may be, for example, data of 64 bytes. The hash value 104A of the current block is updated to a new hash value at predetermined intervals by the center server 10. The encryption key 105 is fixed data without being updated. The encryption key 105A is encrypted data containing, for example, a filename of valuables data, a date and time of a transaction or file creation, and data of 30 bytes from a beginning. The block 101A can contain a file ID of 4 bytes as information for identifying the block 101A.

With reference to FIGS. 13 and 14, the database (body data storage unit 272) of the colony server 20 stores a data block group 200. A plurality of data blocks 201A to 201D contained in the data block group 200 do not constitute the blockchain but are stored independently of each other.

The one data block 201A contains at least, for example, a hash value 204A of a current block and body data 205A. The hash value 204A may be data of, for example, 64 bytes. The body data 205A is, for example, data of 31 bytes and thereafter of the valuables data, and can contain a filename of the valuables data and a user's user ID as required. The data block 201A can contain a file ID of 4 bytes as information for identifying the data block 201A.

The center server 10 updates the hash value 104A of the current block at predetermined intervals and provides notification to the colony server 20. The predetermined interval may be 24 hours or shorter such as 1 hour, 2 hours, 3 hours, 4 hours, 5 hours, or 6 hours, or may be 24 hours or longer. The colony server 20 receives the notification from the center server 10, and updates the hash value 204A to the same value as the hash value 104A. Thus, it looks as if the hash value 104A of the block containing the encryption key 105A and the hash value 204A of the block containing the body data 205A are updated in a linking manner in the blockchain. Such an operation is also referred to as "metabolizing" in the present invention. Specifically, update of the hash value 104A and the hash value 204A at predetermined intervals is referred to as "metabolizing while linking."

As such, with the valuables management system according to the present invention, the valuables data is managed in a divided manner into the partial data and the body data, the hash value of the partial data stored as the encryption key in one block in the blockchain 100 managed by the center server 10 is updated at predetermined intervals, and the hash value of the body data in the colony server 20 is updated to the same value as that of the partial data (that is, metabolizing while linking). Then, even if the body data is leaked from the colony server 20 through unauthorized access or the like, the hash value of the encryption key containing the partial data paired with the unauthorizedly leaked body data is updated at predetermined intervals, and thus an encryption key containing a hash value matching the hash value of the body data no longer exists. Thus, an encryption key necessary for recovering the valuables data cannot be reached by analyzing the unauthorizedly leaked body data, thereby substantially precluding recovery of the valuables data.

Figure 15:
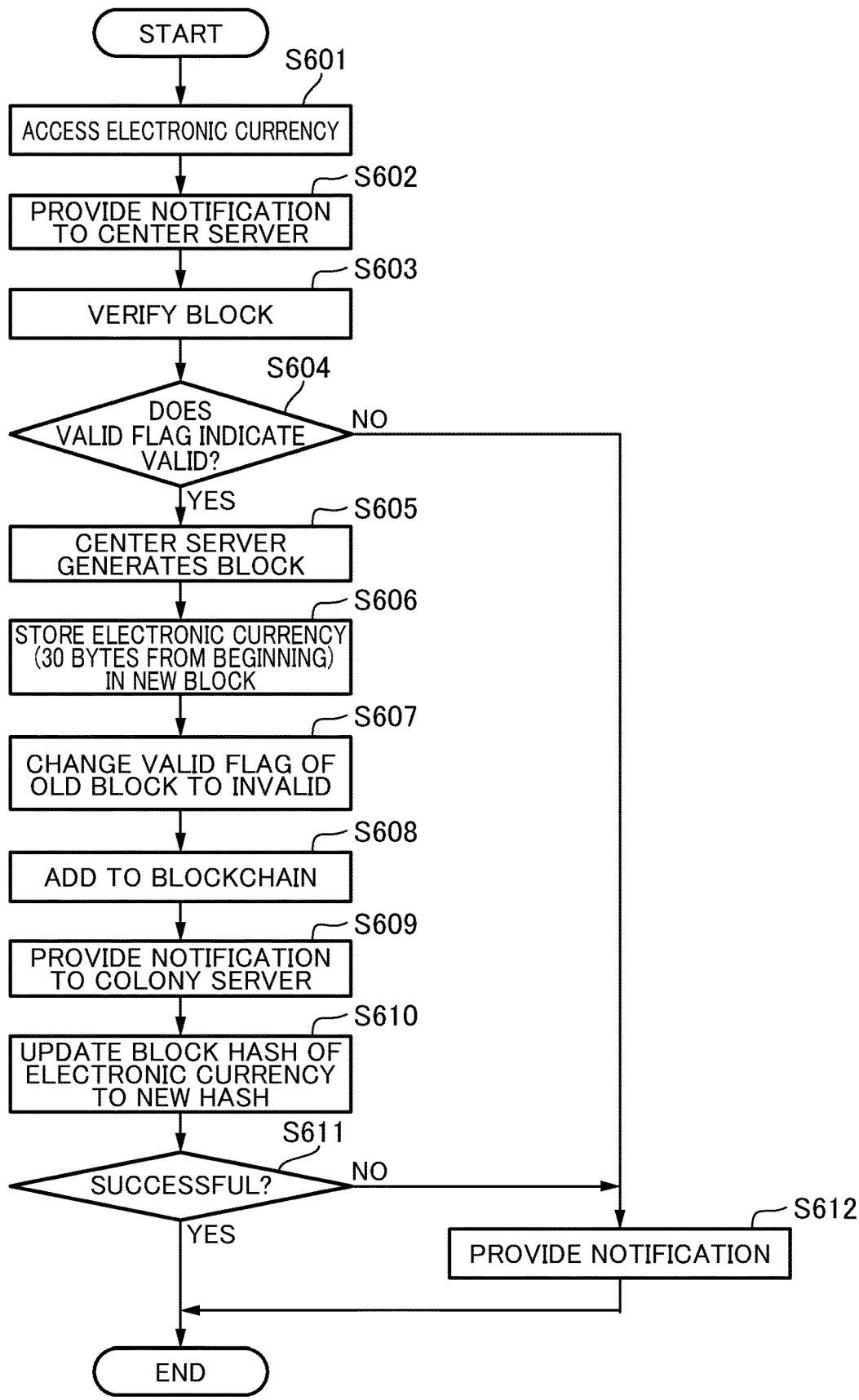
FIG. 15 is a flowchart of processing for the center server connecting a new block containing an encryption key to the blockchain.

FIG. 15 is a flowchart of processing for the center server connecting a new block containing an encryption key to the blockchain. The flowchart in FIG. 15 corresponds to processing for the information processing terminal 30 registering electronic currency data as an example of valuables data through the colony server 20 in the center server 10, for example, as shown in FIG. 7.

When the information processing terminal 30 or the like accesses electronic currency data as an example of valuables data including registration or generation of the electronic currency data (step S601), the colony server 20 provides notification of that fact to the center server 10 (step S602), and the center server 10 verifies a block in the blockchain 100 (step S602). The center server 10 stores, in association with each of a plurality of blocks in the blockchain 100, a valid flag indicating that each block is valid or invalid. The center server 10 checks a valid flag corresponding to a current block (for example, a last block) in the blockchain 100 (step S604). If the valid flag indicates invalid (No in step S604), the center server 10 provides notification such as an error message (step S612).

If the valid flag corresponding to the current block (last block) in the blockchain 100 indicates valid (for example, YES in step S604), the center server 10 generates a block to be newly added to the blockchain 100 (step S605). Then, to connect the newly generated block (new block) to the blockchain 100, the center server 10 stores partial data (for example, 30 bytes from a beginning) of the electronic currency data in the new block (step S606). Further, the center server 10 changes a valid flag, which has indicated valid, of a block (old block) to invalid (step S607), and adds the new block to the blockchain 100 (step S608). Specifically, the new block is connected to the old block in the blockchain 100.

Then, the center server 10 provides notification of completion of addition of the partial data (for example, data of 30 bytes from the beginning) of the electronic currency and a block hash value of the new block to the colony server 20 (step S609). The colony server 20 updates a hash value of body data (for example, data of 31 bytes and thereafter) of the electronic currency to the hash value of the new block notified by the center server 10 (step S610). The colony server 20 checks whether or not registration of the electronic currency in the center server 10 is successful (step S610). If the registration is successful (YES in step S611), the colony server 20 finishes the processing. If the registration is unsuccessful (No in step S611), the colony server 20 provides notification such as an error message (step S612).

FIG. 16 shows a configuration of the blockchain managed by the center server. One block 101A in the blockchain 100 basically has the same configuration as in FIG. 13, and contains a hash value 102A of a preceding block, a hash value 104A of a current block, and an encryption key 105A. The same applies to other blocks 101B, 101C. The blocks 101A, 101B, 101C contain nonces 103A, 103B, 103C, respectively, which can be used, for example, for calculation of a hash value to connect a subsequent block by the same method as Proof of Work. When the valuables management system includes one center server 10, there is no need to use a nonce because verification of the blockchain can be omitted. When the valuables management system includes a plurality of center servers 10, and the blockchain 100 is managed by the plurality of center servers 10, however, nonces can be used in each center server 10 to verify the blockchain and add a new block.

In the blockchain 100, the block 101A and the block 101B are coupled because the hash value 104A is the same as the hash value 102B, and the block 101B and the block 101C are coupled because the hash value 104B is the same as the hash value 102C.

FIGS. 17A and 17B show an outline of various types of information stored in the database of the center server. For example, as shown in FIG. 2, the center server 10 includes, as the databases, the colony information storage unit 171 for storing colony information, the user information storage unit 172 for storing user information, and the encryption key storage unit 173 for storing the blockchain 100 as shown in FIG. 16. The colony information in FIG. 17A is stored, for example, in the colony information storage unit 171. The colony information includes, for example, a colony server ID of one or more colony servers 20 connected to the center server 10, a user ID of a user who logs in the colony server 20 from the information processing terminal 30, and a valid flag indicating whether both the colony server ID and the user ID are valid (TRUE) or either one is invalid (FALSE). For example, the center server 10 can identify a valid colony server ID and a valid user ID in accordance with the valid flag with reference to the colony information stored in the colony information storage unit 171.

The user information in FIG. 17B is stored, for example, in the user information storage unit 172. The user information includes, for example, a user ID and an email address of a user of the valuables management system, and a valid flag indicating whether both the user ID and the email address are valid (TRUE) or either one is invalid (FALSE). For example, the center server 10 can identify a valid user ID and a valid email address in accordance with the valid flag with reference to the user information stored in the user information storage unit 172. In this embodiment, the colony information stored in the colony information storage unit 171 and the user information stored in the user information storage unit 172 are stored as separate data independently of data related to the blockchain 100 stored in the encryption key storage unit 173.

FIG. 18 shows an outline of information stored in the database of the colony server. For example, as shown in FIG. 2, the colony server 20 includes, as the databases, the hash information storage unit 271 for storing hash information, and the body data storage unit 272 for storing the data block group 200 of body data as shown in FIG. 14. The hash information in FIG. 18 is stored, for example, in the hash information storage unit 271. The hash information includes, for example, a user ID, a block hash (for example, data of 64 bytes) of a data block that stores body data, a transaction date and time (year/month/date/hour:minute:second (YYYY/MM/DD/HH:MM:SS)) of valuables, and a valid flag indicating whether at least a block hash value is valid (TRUE) or invalid (FALSE). For example, the colony server 20 can determine whether or not the hash value is valid in accordance with the valid flag with reference to the hash information stored in the hash information storage unit 271.

Figure 19:
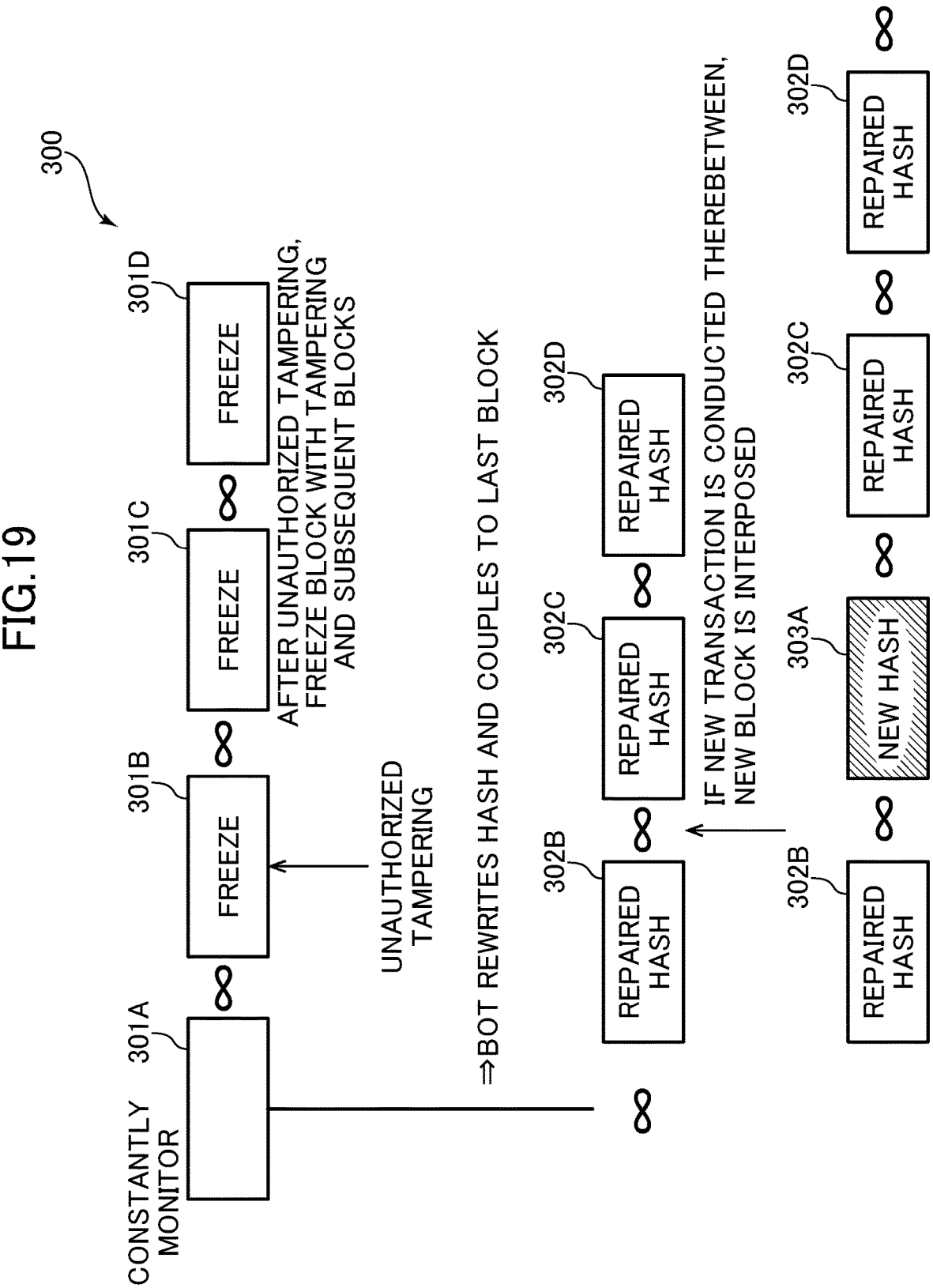
FIG. 19 shows an outline of processing for freezing and repairing blocks when tampering is detected in the blockchain.

The center server 10 can include a monitor bot for monitoring tampering of the blockchain, and a repair bot for repairing the blockchain. The bot means an application or a program for automating a certain task or processing. FIG. 19 illustratively shows an outline of processing of the monitor bot and the repair bot for a blockchain 300 including a plurality of coupled blocks 301A to 301D. Specifically, FIG. 19 shows an outline of processing for freezing and repairing the blocks when tampering is detected in the blockchain. The blockchain 300 shown as an example of a blockchain in FIG. 19 basically has the same structure as the blockchain 100 in FIG. 16.

The monitor bot can constantly monitor the blockchain 300 managed by the center server 10. For example, when the monitor bot finds tampering (unauthorized alteration or the like) in the block 301B in the blockchain 300, the center server 10 or the monitor bot invalidates, for example, a flag corresponding to the block 301B to invalidate the block 301B, and similarly invalidates the subsequent blocks, that is, the block 301C coupled to the block 301B and the block 301D coupled to the block 301C. Invalidating a block in this manner is herein also referred to as freezing a block.

After the monitor bot freezes the block with the unauthorized tampering and the subsequent blocks in response to finding the unauthorized tampering, the repair bot repairs the blockchain 300. The repair bot repairs the blocks to recover the block 301B with the tampering and the subsequent blocks in accordance with a correct transaction record with reference to a book database (not shown) managed independently of the blockchain 300 managed by the center server 10. For example, when the center server 10 is operated in a financial institution such as a bank, a book database of a server completely independent of the center server 10 stores a valuables transaction record. The repair bot can recover the blockchain 300 managed by the center server 10 with reference to the book database.

In the example of repair in FIG. 19, the repair bot generates a block 302B repaired with reference to the book database, rewrites a hash value of the block 301A to equalize a hash value of the block 302B with the hash value of the block 301A, and thus couples the block 302B to the block 301A. Similarly, the repair bot generates a block 302C repaired with reference to the book database, equalizes a hash value of the block 302C with the hash value of the block 302B, and thus couples the block 302C to the block 302B. The same applies to the block 302D.

If a new transaction is conducted during the repair by the repair bot, for example, if a new transaction is conducted after the repair of the block 302B, a new block 303A is interposed between the block 302B and the block 302C. Specifically, after the repair of the block 302B, the block 303A storing a new transaction record is generated, and a hash value of the block 303A is equalized with the hash value of the repaired block 302B, and thus the block 303A is coupled to the block 302B. Similarly, the block 302C is coupled to the block 303A, and the block 302D is coupled to the block 302C.

Figure 20:
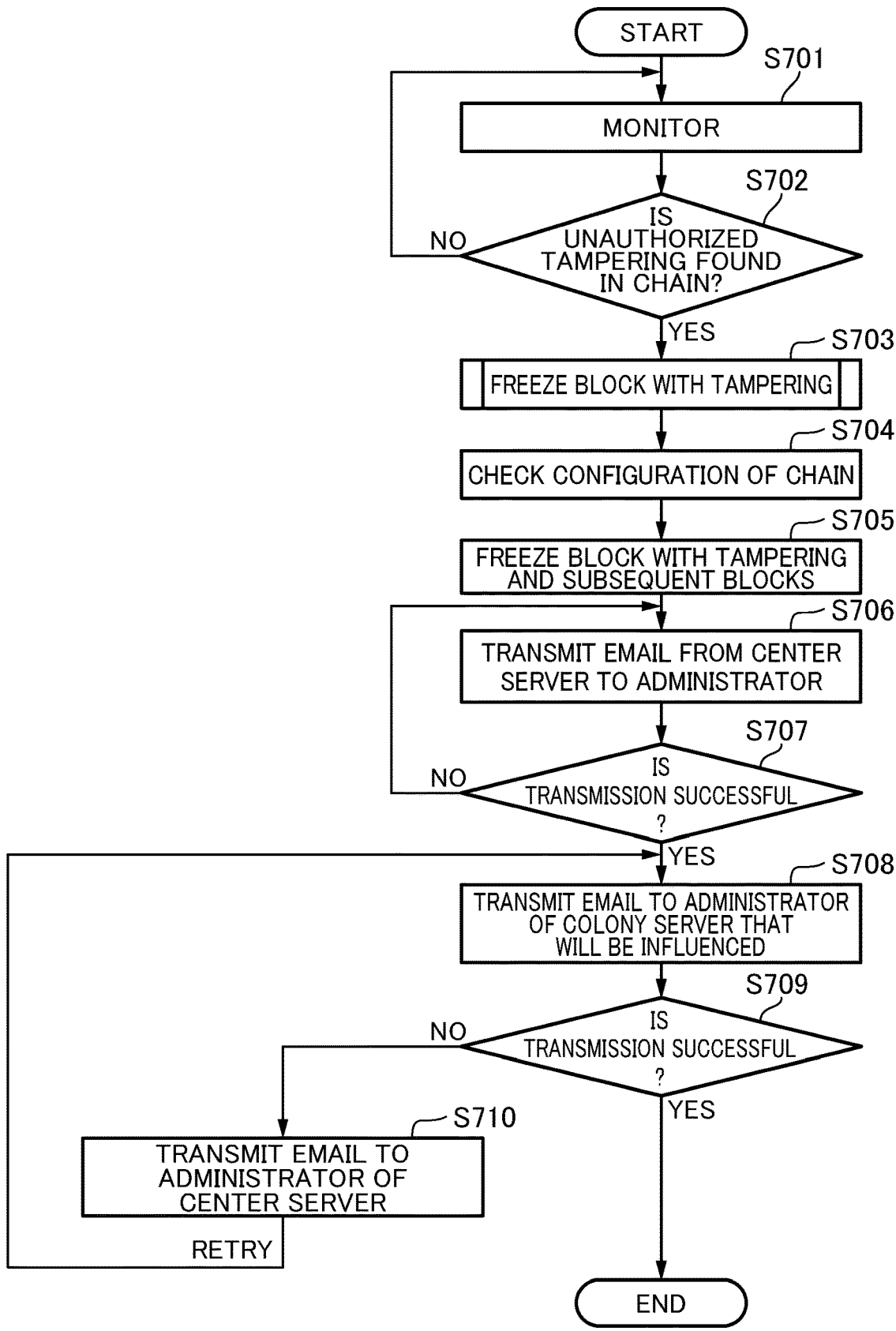
FIG. 20 is a flowchart of processing when the blockchain is monitored to detect tampering.

FIG. 20 is a flowchart of processing when the blockchain is monitored to detect tampering. The monitor bot at least temporarily resides in, for example, the center server 10 to constantly monitor the blockchain (for example, blockchain 100) (step S701). The monitor bot monitors and checks whether or not tampering (unauthorized alteration or the like) is found in a block in the blockchain (step S702). If no tampering is found (NO in step S702), the monitor bot continues monitoring (step S701). If tampering is found (YES in step S702), as shown in FIG. 19, the monitor bot or the center server 10 freezes a block with the unauthorized tampering (step S703). Then, after checking a configuration of the blockchain (step S704), the monitor bot or the center server 10 similarly freezes a block coupled to the block with the tampering and subsequent blocks (step S705).

After freezing the blocks with the tampering in the blockchain, the center server 10 transmits an email to an administrator (step S706), and checks whether or not email transmission is successful (step S707). If the email transmission is unsuccessful (NO in step S707), the center server 10 again transmits the email (step S706). If the email transmission is successful (YES in step S707), the center server 10 transmits an email to an administrator of each colony server 20 that will be influenced by freezing of the blockchain (step S708).

The center server 10 checks whether or not the email transmission to the administrator of the colony server 20 is successful (step S709). If the email transmission is successful (YES in step S709), the center server 10 finishes the processing. If the email transmission is unsuccessful (NO in step S709), the center server 10 transmits an email to the administrator of the center server 10 to provide notification of that fact (step S710), and retries to transmit the email to the administrator of the colony server for which the email transmission was unsuccessful (step S708).

FIG. 21 is a flowchart of processing for freezing a block in the blockchain. FIG. 21 shows an embodiment different from that in the flowchart in FIG. 20. A user manually obtains data corresponding to a block in the blockchain, or a bot accesses data corresponding to a block in the blockchain in metabolizing (processing for providing notification of updated hash value) (step S801). Hash values of stored files corresponding to the data are compared (step S802), and whether or not the block is tampered with (step S803) is checked. If the block is not tampered with (NO in step S803), the processing is normally finished. If the block is tampered with (YES in step S803), an email address of the user (and an administrator) is obtained from the center server 10 (step S804), emails are transmitted to the user and an administrator of a colony server, and whether or not email transmission is successful is checked (step S805). If the email transmission is successful (YES in step S805), relevant data is frozen (specifically, a flag indicating valid or invalid related to the data is turned off to indicate that the data is invalid) (step S806). If the email transmission is unsuccessful (NO in step S805), the email is again transmitted to check a state of the email transmission (step S805).

FIG. 22 is a flowchart of processing for repairing the blockchain. After the freezing of the blockchain, the center server 10 receives, from the colony server 20, partial data of valuables data and an instruction to add a new block (step S901), and checks whether or not the end of the blockchain is frozen (step S902). If the end of the blockchain is not frozen (NO in step S902), the center server 10 goes to step S905. If the end of the blockchain is frozen (YES in step S902), the center server 10 follows the blockchain and searches for an unfrozen block (step S903). When finding an unfrozen block, the center server 10 couples a new block to the unfrozen block to cause the blockchain to branch (step S904). Then, the center server 10 generates an encryption key containing the partial data received from the colony server 20 (step S905), stores the encryption key, and generates a blockchain (step S906). Finally, the center server 10 provides notification of a hash value of the generated block to the colony server 20 as in the registration of valuables data in FIG. 7 (step S907).

INDUSTRIAL APPLICABILITY

The valuables management system and the like according to the present invention are applicable to electronic commerce to safely store valuables data such as cryptocurrency, virtual currency, electronic currency, or valuable securities through a network such as the Internet in a plurality of servers forming a cloud, and allow an information processing terminal used by a user to obtain the valuables data as appropriate in response to a request from the terminal.

REFERENCE SIGNS LIST

10 center server
11 CPU
12 memory
13 bus
14 input/output interface
15 input unit
16 output unit
17 storage unit
18 communication unit
20 colony server
20A colony server
20B colony server
21 CPU
22 memory
23 bus
24 input/output interface
25 input unit
26 output unit
27 storage unit
28 communication unit 30 information processing terminal
30X information processing terminal
30Y information processing terminal
100 blockchain
101A block
101B block
101C block
102A hash value
102B hash value
102C hash value
103A nonce
103B nonce
104A hash value
104B hash value
105 encryption key
105A encryption key
111 partial data management unit
112 hash notification unit
171 colony information storage unit
172 user information storage unit
173 encryption key storage unit
200 data block group
201A data block
204A hash value
205A body data
211 division transmission unit
212 body data management unit
271 hash information storage unit
272 body data storage unit
300 blockchain
N1 network
N2 network
X user
Y user

The invention claimed is:

1. A valuables management system comprising at least:
a terminal;
a colony server connected through a first network to the terminal; and
a center server connected through a second network to the colony server,
wherein the terminal transmits a transaction request related to valuables to the colony server,
the colony server includes a colony server processor, the colony server processor being configured to:
divide valuables data obtained or generated in response to the transaction request related to the valuables into partial data containing data of a predetermined size from a beginning, and body data containing data of remaining data other than the partial data with the predetermined size, and transmit the partial data to the center server, and
receive a block hash value from the center server, and store the block hash value associated with the body data as a hash value of the body data,
the center server includes a center server processor, the center server processor being configured to:
encrypt the partial data, generate an encryption key based on the encrypted partial data, generate a block that stores the generated encryption key, and add the block to a blockchain, and
update a block hash value of the block at predetermined intervals and transmit the updated block hash value to the colony server, and
the colony server processor updates the hash value of the body data to the block hash value transmitted from the center server processor at the predetermined intervals.

2. The valuables management system according to claim 1, wherein a block in the blockchain includes a flag that indicates valid when a new block can be connected to the block, and indicates invalid when a new block cannot be connected to the block, and
the center server processor determines whether or not a flag of a destination block indicates valid when a new block is connected, generates a new block when the flag indicates valid, stores, in the new block, at least the encryption key, a block hash of the destination block, and a block hash of the new block, invalidates the flag of the destination block when the new block is connected to the destination block, and further stores, in the new block, a flag that indicates valid as an initial value.

3. The valuables management system according to claim 1, wherein the center server processor encrypts the partial data together with at least one of a filename and a transaction date and time of the valuables data, and the encryption key contains the partial data and at least one of the filename and the transaction date and time.

4. The valuables management system according to claim 1, wherein the transaction request related to the valuables contains the valuables data corresponding to the valuables uploaded from the terminal.

5. The valuables management system according to claim 1, wherein the transaction request related to the valuables is a request to cause the colony server to generate the valuables data corresponding to the valuables.

6. The valuables management system according to claim 1, wherein the predetermined size is 30 bytes or less from the beginning of the valuables data.

7. The valuables management system according to claim 1, wherein the predetermined interval is 24 hours or shorter.

8. The valuables management system according to claim 1, wherein the first network is the Internet and the second network is a closed network.

9. The valuables management system according to claim 1, wherein the center server processor is further configured to monitor tampering of the blockchain, and when finding tampering of one block in the blockchain, the center server processor invalidates the one block and subsequent blocks.

10. The valuables management system according to claim 9, wherein the center server processor is further configured to repair the blockchain, and after invalidation of the one block and the subsequent blocks, the center server processor repairs the blocks in the blockchain with reference to a book database managed independently of the blockchain.

11. The valuables management system according to claim 1, wherein the colony server processor divides the valuables data into partial data containing data of the predetermined size from any one part of the valuables data in place of the partial data containing the data of the predetermined size from the beginning, and body data containing data of a remaining part other than the any one part of the valuables data in place of the remaining data.

12. A valuables management method performed by a valuable securities system including at least a terminal, a colony server connected through a first network to the terminal, and a center server connected through a second network to the colony server, comprising the steps of:
the terminal transmitting a transaction request related to valuables to the colony server;
the colony server dividing valuables data obtained or generated in response to the transaction request related to the valuables into partial data containing data of a predetermined size from a beginning, and body data containing data of remaining data other than the partial data with the predetermined size, and transmitting the partial data to the center server;

the center server encrypting the partial data;

the center server generating an encryption key based on the generated encrypted partial data, generating a block that stores the generated encryption key, and adding the block to a blockchain; and the center server updating a block hash value of the block at predetermined intervals and transmitting the updated block hash value to the colony server, wherein the colony server updates a hash value of the body data to the block hash value transmitted from the center server at the predetermined intervals.

13. The valuables management method according to claim 12, wherein a block in the blockchain includes a flag that indicates valid when a new block can be connected to the block, and indicates invalid when a new block cannot be connected to the block, and in the step of adding the block to the blockchain, the center server determines whether or not a flag of a destination block indicates valid when a new block is connected, generates a new block when the flag indicates valid, stores, in the new block, at least the encryption key, a block hash of the destination block, and a block hash of the new block, invalidates the flag of the destination block when the new block is connected to the destination block, and further stores, in the new block, a flag that indicates valid as an initial value.

14. The valuables management method according to claim 12, wherein in the step of encrypting the partial data, the center server encrypts the partial data together with at least one of a filename and a transaction date and time of the valuables data, and the encryption key contains the partial data and at least one of the filename and the transaction date and time.

15. The valuables management method according to claim 12, wherein the transaction request related to the valuables contains the valuables data corresponding to the valuables uploaded from the terminal.

16. The valuables management method according to claim 12, wherein the transaction request related to the valuables is a request to cause the colony server to generate the valuables data corresponding to the valuables.

17. The valuables management method according to claim 12, wherein the predetermined size is 30 bytes or less from the beginning of the valuables data.

18. The valuables management method according to claim 12, wherein the predetermined interval is 24 hours or shorter.

19. The valuables management method according to claim 12, wherein the first network is the Internet and the second network is a closed network.

20. The valuables management method according to claim 12, wherein the step of the colony server dividing valuables data obtained or generated in response to the transaction request related to the valuables into partial data containing data of the predetermined size from a beginning, and body data containing the remaining data, and transmitting the partial data to the center server includes dividing the valuables data into partial data containing data of a predetermined size from any one part of the valuables data in place of the partial data containing the data of the predetermined size from the beginning, and body data containing data of a remaining part other than the any one part of the valuables data in place of the remaining data.

* * * * *